United States Patent
Fawcett

(10) Patent No.: US 10,797,943 B2
(45) Date of Patent: Oct. 6, 2020

(54) CONFIGURATION MANAGEMENT IN A STREAM COMPUTING ENVIRONMENT

(71) Applicant: INTERNATIONAL BUSINESS MACHINES CORPORATION, Armonk, NY (US)

(72) Inventor: Bradley W. Fawcett, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 351 days.

(21) Appl. No.: 15/485,366

(22) Filed: Apr. 12, 2017

(65) Prior Publication Data

US 2018/0302275 A1 Oct. 18, 2018

(51) Int. Cl.
G06F 15/173 (2006.01)
H04L 12/24 (2006.01)

(52) U.S. Cl.
CPC ...... H04L 41/0803 (2013.01); H04L 41/0843 (2013.01)

(58) Field of Classification Search
CPC ......... H04L 41/50; H04L 41/12; H04L 41/08; H04L 41/0803; H04L 67/34
USPC ................. 709/223, 224, 220, 222
See application file for complete search history.

(56) References Cited

U.S. PATENT DOCUMENTS

| | | | |
|---|---|---|---|
| 8,732,300 B2 | 5/2014 | Barsness et al. | |
| 8,874,751 B2 | 10/2014 | Fawcett | |
| 8,898,505 B2 | 11/2014 | Fawcett | |
| 9,015,721 B2* | 4/2015 | Venkataraman | G06F 9/5066 718/102 |
| 2013/0145031 A1 | 6/2013 | Fawcett | |
| 2013/0159973 A1* | 6/2013 | Ciano | G06F 8/71 717/121 |
| 2014/0317305 A1* | 10/2014 | Branson | H04L 65/602 709/231 |
| 2015/0257040 A1* | 9/2015 | Moore, Jr. | H04W 28/20 370/329 |
| 2016/0342607 A1 | 11/2016 | Fawcett | |
| 2017/0003984 A1* | 1/2017 | Gatson | G06F 9/44505 |
| 2018/0083839 A1 | 3/2018 | Fawcett | |
| 2018/0176083 A1* | 6/2018 | Annamaneni | H04L 41/0853 |
| 2018/0203901 A1 | 7/2018 | Fawcett | |
| 2018/0302275 A1 | 10/2018 | Fawcett | |
| 2019/0097880 A1 | 3/2019 | Fawcett | |

OTHER PUBLICATIONS

IBM, List of IBM Patents or Patent Applications Treated as Related, Appendix P, dated Nov. 30, 2018, 2 pages.

(Continued)

*Primary Examiner* — Kaylee J Huang
(74) *Attorney, Agent, or Firm* — Michael O'Keefe

(57) ABSTRACT

Disclosed aspects relate to configuration management in a stream computing environment to process a stream of tuples using a compiled application bundle. A set of configuration overlay parameters may be established separate from the compiled application bundle. A set of configuration overlay parameter values may be ascertained with respect to the set of configuration overlay data. A stream environment application overlay configuration may be determined based on the set of configuration overlay parameter values. The stream of tuples may be processed using the stream environment application overlay configuration.

19 Claims, 16 Drawing Sheets

(56) References Cited

OTHER PUBLICATIONS

Pending U.S. Appl. No. 16/204,083, filed Nov. 29, 2018, entitled: "Configuration Management in a Stream Computing Environment".
Fawcett, "Operator Fusion Management in a Stream Computing Environment," Application and Drawings, Filed on Sep. 22, 2016, 75 Pages, U.S. Appl. No. 15/273,666.
Fawcett, "Operator Fusion Management in a Stream Computing Environment," Application and Drawings, Filed on Jan. 17, 2017, 74 Pages, U.S. Appl. No. 15/408,416.
IBM, "IBM Streams V4.2 Extends Stream Processing to New Markets," IBM United States Software Announcement, Sep. 13, 2016, p. 1-19, Announcement 216-309, Grace Period Disclosure.
Orekhov, "Complex Data Processing Gets Simpler With Cascading," EPAM Blog, p. 1-5, EPAM Belarus, EPAM Systems, Inc., https://www.epam.com/ideas/blog/complex-data-processing-gets-simpler-with-cascading, Accessed on Apr. 11, 2017.

\* cited by examiner

1500

| configuration setting | Performance Tuner | Instance Administrator | Application Developer | Resulting config value |
|---|---|---|---|---|
| jobName | jobName=Tuned MyJob | | jobName = myJob | jobName=Tuned MyJob |
| hostpool config instruction | | convertTags{Red,Blue} to {Rack1,Rack2} | hostpool{Red, Blue} hostpool{Yellow, Black} | hostpool (Rack1,Rack2) hostpool {Yellow, Black} |
| partitionColocation (fusing) | partitionColocation {op1, op2, op3} | | partitionColocation {op4, op5} | partitionColocation {op1,2,3} partitionColocation {op4,5} |
| hostIsolation (wildcarding) | hostIsolation (PerfRegion*) | | | hostIsolation (PerfRegion*) |
| | | | | |

```
{
  "jobConfigOverlays": [
    {
      "jobConfig": {
        "jobName": "myJob",
        "jobGroup": "myJobGroup",
        "data-directory": "myDataDir",
      },
      "operatorConfigs": {
        "operators": [
          { "nameSpec": "Op_2", "hostIsolation": true, "declaredHost": "hostB" },
          { "nameSpec": "Op_1", "partitionIsolation": true }
        ],
        "hostColocationGroups": [
          {
            "groupName": "hcig1",
            "members": ["Op_10", "Op_11"]
          }
        ],
        "partitionColocationGroups": [
          {
            "groupName": "pcig1",
            "members": ["Op_1"]
          }
        ],
        "poolPlacementGroups": [
          {
            "size": 10,
            "tags": ["red", "blue"],
            "operatorsInPool": [
              { "nameSpec": "Op_1", "inPoolIndex": 4 },
              { "nameSpec": "Op_6" }
            ]
          }
        ]
      },
      "configInstructions": {
        "convertTagSet": [
          {
            "originalTagSet": ["tag4", "tag5"],
            "targetTagSet": ["tag2", "tag1"]
          }
        ]
      }
    }
  ],
  "fusionResults": [
    {
      "names": ["Op_6", "Op_5"],
      "declaredHosts": ["hostB", "hostA"]
    },
    {
      "names": ["Op_1", "Op_2"],
      "tags": ["tag2", "tag1"]
    }
  ]
}
```

FIG. 16

CONFIGURATION MANAGEMENT IN A STREAM COMPUTING ENVIRONMENT

STATEMENT REGARDING PRIOR DISCLOSURES BY THE INVENTOR OR A JOINT INVENTOR

Aspects of the present invention have been disclosed by the Applicant, who obtained the subject matter disclosed directly from the inventors, in the product IBM Streams Version 4.2, made available to the public on Sep. 23, 2016. The following disclosure is submitted under 35 U.S.C. § 102(b)(1)(A).

BACKGROUND

This disclosure relates generally to computer systems and, more particularly, relates to configuration management in a stream computing environment to process a stream of tuples using a compiled application bundle. The amount of data that needs to be managed is increasing. As data needing to be managed increases, the need for configuration management in a stream computing environment to process a stream of tuples using a compiled application bundle may also increase.

SUMMARY

Aspects of the disclosure relate to configuration management in a stream computing environment to process a stream of tuples using a compiled application bundle. A stream environment application overlay configuration may be determined for a compiled application bundle to facilitate processing of streams of tuples in a stream computing environment. The stream environment application overlay configuration may be determined to customize execution of the compiled application bundle without recompiling the compiled application bundle. The stream environment application overlay configuration may be developed for the compiled application bundle based on developer-oriented data, instance-oriented data, and performance-oriented data. The stream environment application overlay configuration may be used to manage host placement allocations, operator fusion decisions, operation attribute modification, and other configuration elements of the compiled application bundle. The stream environment application overlay configuration may be used to facilitate performance of advance topology evaluation, input command execution, and stream operator group modification.

Disclosed aspects relate to configuration management in a stream computing environment to process a stream of tuples using a compiled application bundle. A set of configuration overlay parameters may be established separate from the compiled application bundle. A set of configuration overlay parameter values may be ascertained with respect to the set of configuration overlay data. A stream environment application overlay configuration may be determined based on the set of configuration overlay parameter values. The stream of tuples may be processed using the stream environment application overlay configuration.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 15 illustrates an example of a set of configuration data for configuration management in a stream computing environment to process a stream of tuples using a compiled application bundle, according to embodiments.

FIG. 16 illustrates an example of a data format for configuration management in a stream computing environment to process a stream of tuples using a compiled application bundle, according to embodiments.

Figure 1:
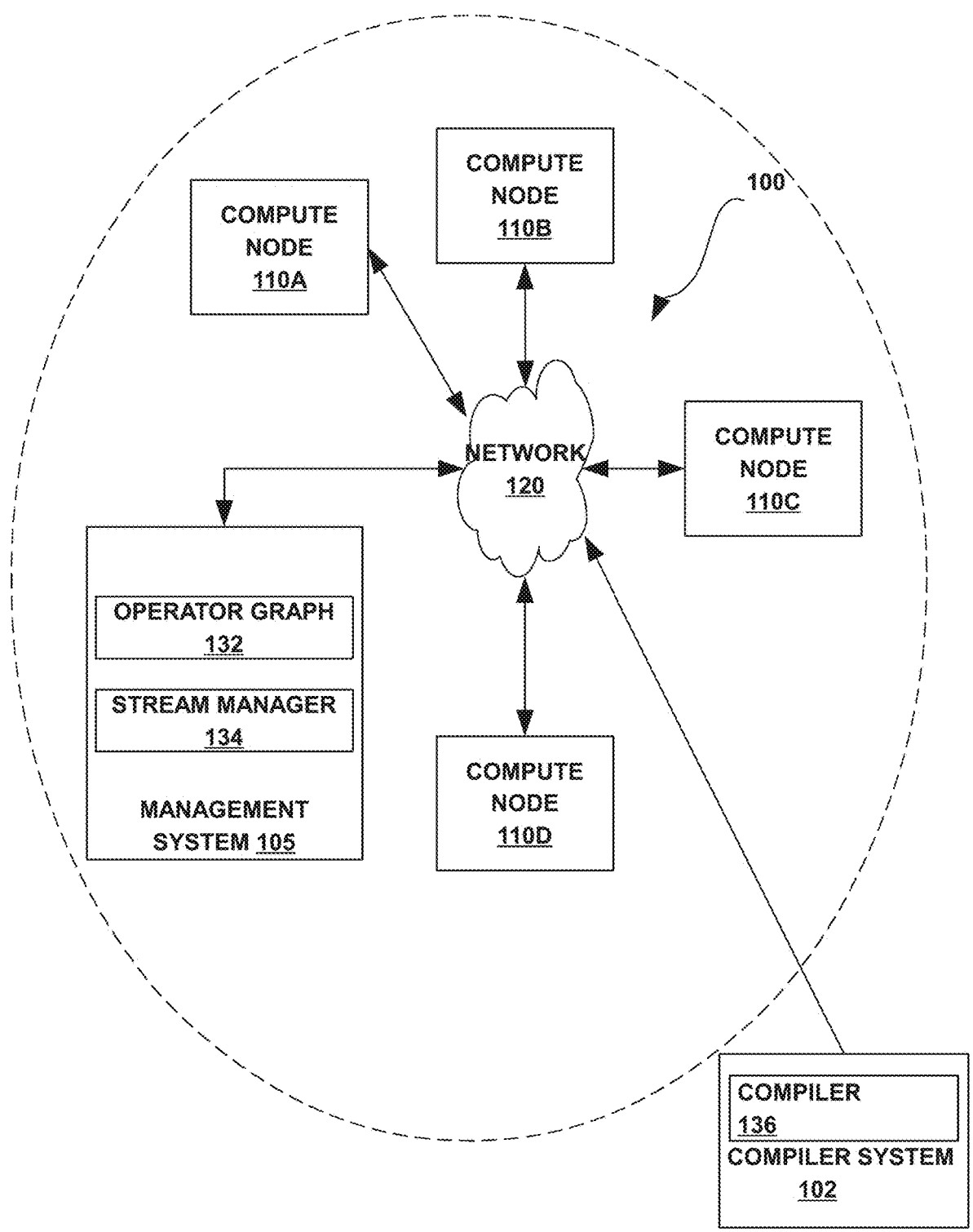
FIG. 1 illustrates an exemplary computing infrastructure to execute a stream computing application according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to configuration management in a stream computing environment to process a stream of tuples using a compiled application bundle. A stream environment application overlay configuration may be determined for a compiled application bundle to facilitate processing of streams of tuples in a stream computing environment. The stream environment application overlay configuration may be determined to customize execution of the compiled application bundle without recompiling the compiled application bundle. The stream environment application overlay configuration may be developed for the compiled application bundle based on developer-oriented data (e.g., application development data), instance-oriented data (e.g., instance administration data), and performance-oriented data (e.g., performance tuning data). The stream environment application overlay configuration may be used to manage host placement allocations (e.g., hostpool configuration instructions), operator fusion decisions (e.g., partition co-location, host isolation), operation attribute modification (e.g., job names, tag conversion), and other configuration elements of the compiled application bundle. The stream environment application overlay configuration may be used to facilitate performance of advance topology evaluation (e.g., preview submit-job), input command execution (e.g., configuration instructions), and stream operator group modification (e.g., operator wildcarding). Altogether, leveraging a stream environment application overlay configuration with respect to a compiled application bundle may be associated with benefits such as stream computing application flexibility, resource usage efficiency, and tuple processing performance.

The performance of a stream computing application may be impacted by the configuration of its components. Configuration information for a stream computing application may define which operators are fused together into processing elements, which hosts the processing elements are deployed to, which stream operators are maintained in isolation, resource allocations for processing elements, and the like. Aspects of the disclosure relate to the recognition that, in some situations, the configuration settings for a stream computing application may be established during development and compiled together into the application executable, which may adversely impact the flexibility of the application for the administrators, performance tuners, and other end-users of the stream computing application. Accordingly, aspects of the disclosure relate to determining one or more stream environment application overlay configurations for a compiled application bundle to customize execution of the stream computing application without the need for recompilation. The stream environment application overlay configurations may be based on developer-oriented data, instance-oriented data, and performance-oriented data to promote stream computing application adaptability, flexibility, and performance.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers.

In a stream computing application, stream operators are connected to one another such that data flows from one stream operator to the next (e.g., over a TCP/IP socket). When a stream operator receives data, it may perform operations, such as analysis logic, which may change the tuple by adding or subtracting attributes, or updating the values of existing attributes within the tuple. When the analysis logic is complete, a new tuple is then sent to the next stream operator. Scalability is achieved by distributing an application across nodes by creating executables (i.e., processing elements), as well as replicating processing elements on multiple nodes and load balancing among them. Stream operators in a stream computing application can be fused together to form a processing element that is executable. Doing so allows processing elements to share a common process space, resulting in much faster communication between stream operators than is available using inter-process communication techniques (e.g., using a TCP/IP socket). Further, processing elements can be inserted or removed dynamically from an operator graph representing the flow of data through the stream computing application. In some cases a particular stream operator may not reside within the same operating system process as other stream operators. In addition, stream operators in the same operator graph may be hosted on different nodes, e.g., on different compute nodes or on different cores of a compute node.

Data flows from one stream operator to another in the form of a "tuple." A tuple is a sequence of one or more attributes associated with an entity. Attributes may be any of a variety of different types, e.g., integer, float, Boolean, string, map, list, etc. The attributes may be ordered. In addition to attributes associated with an entity, a tuple may include metadata, i.e., data about the tuple. A tuple may be extended by adding one or more additional attributes or metadata to it. As used herein, "stream" or "data stream" refers to a sequence of tuples. Generally, a stream may be considered a pseudo-infinite sequence of tuples.

Tuples are received and output by stream operators and processing elements. An input tuple corresponding with a particular entity that is received by a stream operator or processing element, however, is generally not considered to be the same tuple that is output by the stream operator or processing element, even if the output tuple corresponds with the same entity or data as the input tuple. An output tuple need not be changed in some way from the input tuple.

Nonetheless, an output tuple may be changed in some way by a stream operator or processing element. An attribute or metadata may be added, deleted, or modified. For example, a tuple will often have two or more attributes. A stream operator or processing element may receive the tuple having multiple attributes and output a tuple corresponding with the input tuple. The stream operator or processing element may only change one of the attributes so that all of the attributes of the output tuple except one are the same as the attributes of the input tuple.

Generally, a particular tuple output by a stream operator or processing element may not be considered to be the same tuple as a corresponding input tuple even if the input tuple is not changed by the processing element. However, to simplify the present description and the claims, an output tuple that has the same data attributes or is associated with the same entity as a corresponding input tuple will be referred to herein as the same tuple unless the context or an express statement indicates otherwise.

Stream computing applications handle massive volumes of data that need to be processed efficiently and in real time. For example, a stream computing application may continuously ingest and analyze hundreds of thousands of messages per second and up to petabytes of data per day. Accordingly, each stream operator in a stream computing application may be required to process a received tuple within fractions of a second. Unless the stream operators are located in the same processing element, it is necessary to use an inter-process communication path each time a tuple is sent from one stream operator to another. Inter-process communication paths can be a critical resource in a stream computing application. According to various embodiments, the available bandwidth on one or more inter-process communication paths may be conserved. Efficient use of inter-process communication bandwidth can speed up processing.

A streams processing job has a directed graph of processing elements that send data tuples between the processing elements. The processing element operates on the incoming tuples, and produces output tuples. A processing element has an independent processing unit and runs on a host. The streams platform can be made up of a collection of hosts that are eligible for processing elements to be placed upon. When a job is submitted to the streams run-time, the platform scheduler processes the placement constraints on the processing elements, and then determines (the best) one of these candidates host for (all) the processing elements in that job, and schedules them for execution on the decided host.

Aspects of the disclosure relate to a system, method, and computer program product for configuration management in a stream computing environment to process a stream of tuples using a compiled application bundle. A set of configuration overlay parameters may be established separate from the compiled application bundle. A set of configuration overlay parameter values may be ascertained with respect to the set of configuration overlay data. A stream environment application overlay configuration may be determined based on the set of configuration overlay parameter values. The stream of tuples may be processed using the stream environment application overlay configuration.

In embodiments, a set of development-oriented data for the set of configuration overlay parameter values for the set of configuration overlay parameters may be ascertained, and the stream environment application overlay configuration may be determined based on the set of development-oriented data. In embodiments, a set of instance-oriented data for the set of configuration overlay parameter values for the set of configuration overlay parameters may be ascertained, and the stream environment application overlay configuration may be determined based on the set of instance-oriented data. In embodiments, a set of performance-oriented data for the set of configuration overlay parameter values for the set of configuration overlay parameters may be ascertained, and the stream environment application overlay configuration may be determined based on the set of performance-oriented data. Altogether, aspects of the disclosure can have performance or efficiency benefits. Aspects may save resources such as bandwidth, disk, processing, or memory.

FIG. 1 illustrates one exemplary computing infrastructure 100 that may be configured to execute a stream computing application, according to some embodiments. The computing infrastructure 100 includes a management system 105 and two or more compute nodes 110A-110D—i.e., hosts—which are communicatively coupled to each other using one or more communications networks 120. The communications network 120 may include one or more servers, networks, or databases, and may use a particular communication protocol to transfer data between the compute nodes 110A-110D. A compiler system 102 may be communicatively coupled with the management system 105 and the compute nodes 110 either directly or via the communications network 120.

The communications network 120 may include a variety of types of physical communication channels or "links." The links may be wired, wireless, optical, or any other suitable media. In addition, the communications network 120 may include a variety of network hardware and software for performing routing, switching, and other functions, such as routers, switches, or bridges. The communications network 120 may be dedicated for use by a stream computing application or shared with other applications and users. The communications network 120 may be any size. For example, the communications network 120 may include a single local area network or a wide area network spanning a large geographical area, such as the Internet. The links may provide different levels of bandwidth or capacity to transfer data at a particular rate. The bandwidth that a particular link provides may vary depending on a variety of factors, including the type of communication media and whether particular network hardware or software is functioning correctly or at full capacity. In addition, the bandwidth that a particular link provides to a stream computing application may vary if the link is shared with other applications and users. The available bandwidth may vary depending on the load placed on the link by the other applications and users. The bandwidth that a particular link provides may also vary depending on a temporal factor, such as time of day, day of week, day of month, or season.

Figure 2:
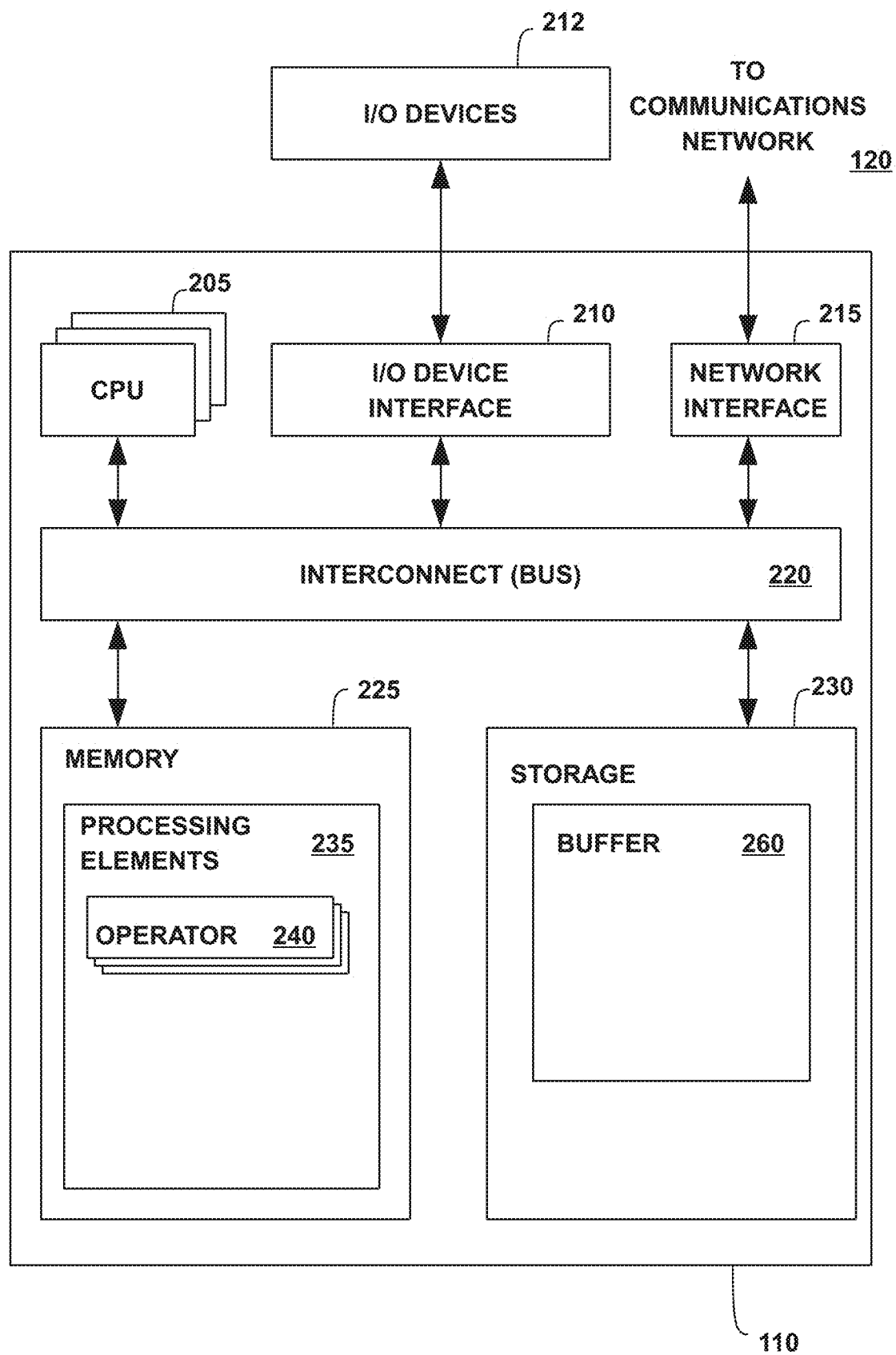
FIG. 2 illustrates a view of a compute node according to embodiments.

FIG. 2 is a more detailed view of a compute node 110, which may be the same as one of the compute nodes 110A-110D of FIG. 1, according to various embodiments. The compute node 110 may include, without limitation, one or more processors (CPUs) 205, a network interface 215, an interconnect 220, a memory 225, and a storage 230. The compute node 110 may also include an I/O device interface 210 used to connect I/O devices 212, e.g., keyboard, display, and mouse devices, to the compute node 110.

Each CPU 205 retrieves and executes programming instructions stored in the memory 225 or storage 230. Similarly, the CPU 205 stores and retrieves application data residing in the memory 225. The interconnect 220 is used to transmit programming instructions and application data between each CPU 205, I/O device interface 210, storage 230, network interface 215, and memory 225. The interconnect 220 may be one or more busses. The CPUs 205 may be a single CPU, multiple CPUs, or a single CPU having multiple processing cores in various embodiments. In one embodiment, a processor 205 may be a digital signal processor (DSP). One or more processing elements 235 (described below) may be stored in the memory 225. A processing element 235 may include one or more stream operators 240 (described below). In one embodiment, a processing element 235 is assigned to be executed by only one CPU 205, although in other embodiments the stream operators 240 of a processing element 235 may include one or more threads that are executed on two or more CPUs 205. The memory 225 is generally included to be representative of a random access memory, e.g., Static Random Access Memory (SRAM), Dynamic Random Access Memory (DRAM), or Flash. The storage 230 is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 215 is configured to transmit data via the communications network 120.

A stream computing application may include one or more stream operators 240 that may be compiled into a "processing element" container 235. The memory 225 may include two or more processing elements 235, each processing element having one or more stream operators 240. Each stream operator 240 may include a portion of code that processes tuples flowing into a processing element and outputs tuples to other stream operators 240 in the same processing element, in other processing elements, or in both the same and other processing elements in a stream computing application. Processing elements 235 may pass tuples to other processing elements that are on the same compute node 110 or on other compute nodes that are accessible via communications network 120. For example, a processing element 235 on compute node 110A may output tuples to a processing element 235 on compute node 110B.

The storage 230 may include a buffer 260. Although shown as being in storage, the buffer 260 may be located in the memory 225 of the compute node 110 or in a combination of both memories. Moreover, storage 230 may include storage space that is external to the compute node 110, such as in a cloud.

The compute node 110 may include one or more operating systems 262. An operating system 262 may be stored partially in memory 225 and partially in storage 230. Alternatively, an operating system may be stored entirely in memory 225 or entirely in storage 230. The operating system provides an interface between various hardware resources, including the CPU 205, and processing elements and other components of the stream computing application. In addition, an operating system provides common services for application programs, such as providing a time function.

Figure 3:
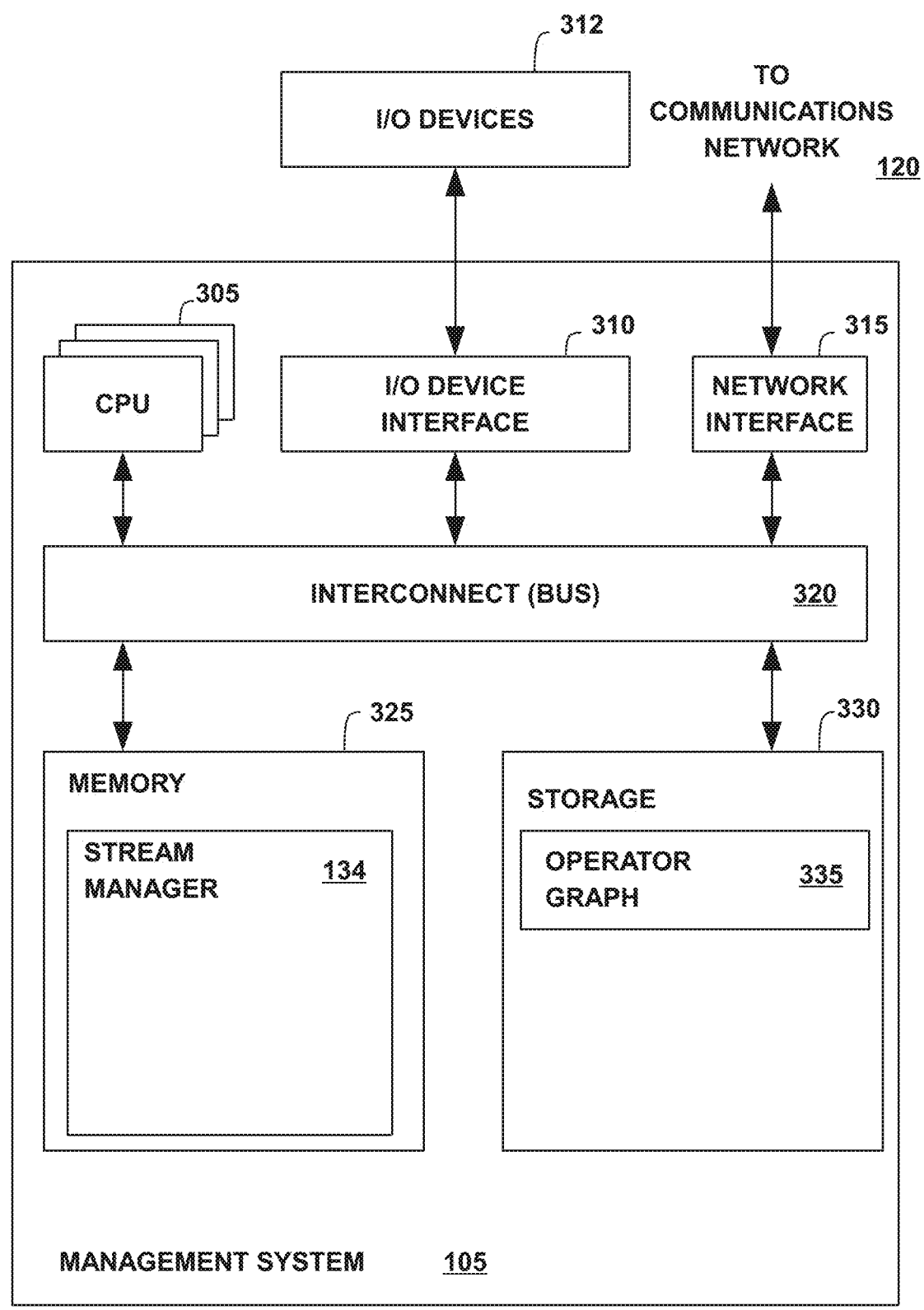
FIG. 3 illustrates a view of a management system according to embodiments.

FIG. 3 is a more detailed view of the management system 105 of FIG. 1 according to some embodiments. The management system 105 may include, without limitation, one or more processors (CPUs) 305, a network interface 315, an interconnect 320, a memory 325, and a storage 330. The management system 105 may also include an I/O device interface 310 connecting I/O devices 312, e.g., keyboard, display, and mouse devices, to the management system 105.

Each CPU 305 retrieves and executes programming instructions stored in the memory 325 or storage 330. Similarly, each CPU 305 stores and retrieves application data residing in the memory 325 or storage 330. The interconnect 320 is used to move data, such as programming instructions and application data, between the CPU 305, I/O device interface 310, storage unit 330, network interface 315, and memory 325. The interconnect 320 may be one or more busses. The CPUs 305 may be a single CPU, multiple CPUs, or a single CPU having multiple processing cores in various embodiments. In one embodiment, a processor 305 may be a DSP. Memory 325 is generally included to be representative of a random access memory, e.g., SRAM, DRAM, or Flash. The storage 330 is generally included to be representative of a non-volatile memory, such as a hard disk drive, solid state device (SSD), removable memory cards, optical storage, Flash memory devices, network attached storage (NAS), connections to storage area-network (SAN) devices, or the cloud. The network interface 315 is configured to transmit data via the communications network 120.

The memory 325 may store a stream manager 134. Additionally, the storage 330 may store an operator graph 335. The operator graph 335 may define how tuples are routed to processing elements 235 (FIG. 2) for processing or stored in memory 325 (e.g., completely in embodiments, partially in embodiments).

The management system 105 may include one or more operating systems 332. An operating system 332 may be stored partially in memory 325 and partially in storage 330. Alternatively, an operating system may be stored entirely in memory 325 or entirely in storage 330. The operating system provides an interface between various hardware resources, including the CPU 305, and processing elements and other components of the stream computing application. In addition, an operating system provides common services for application programs, such as providing a time function.

Figure 4:
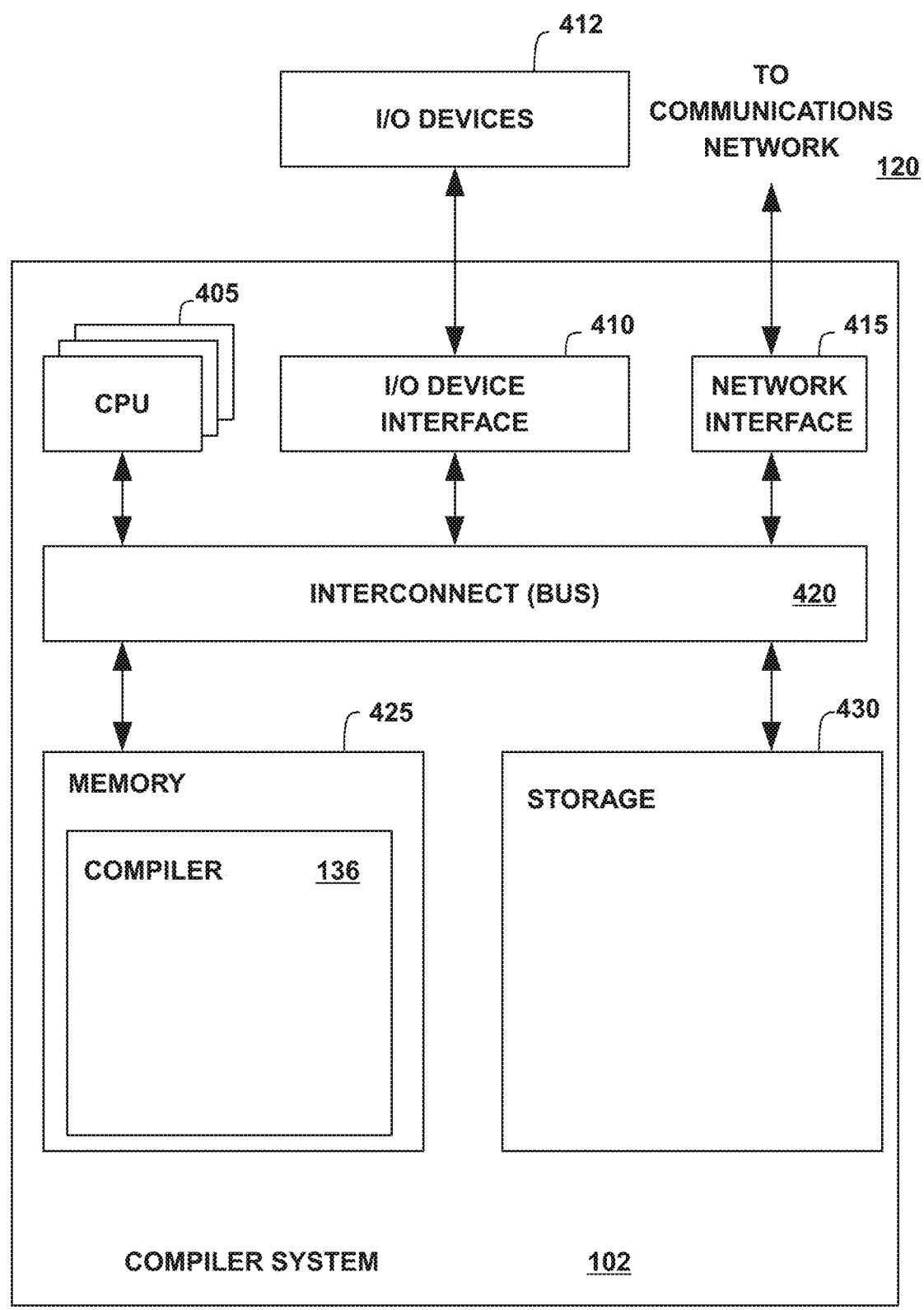
FIG. 4 illustrates a view of a compiler system according to embodiments.

FIG. 4 is a more detailed view of the compiler system 102 of FIG. 1 according to some embodiments. The compiler system 102 may include, without limitation, one or more processors (CPUs) 405, a network interface 415, an interconnect 420, a memory 425, and storage 430. The compiler system 102 may also include an I/O device interface 410 connecting I/O devices 412, e.g., keyboard, display, and mouse devices, to the compiler system 102.

Each CPU 405 retrieves and executes programming instructions stored in the memory 425 or storage 430. Similarly, each CPU 405 stores and retrieves application data residing in the memory 425 or storage 430. The interconnect 420 is used to move data, such as programming instructions and application data, between the CPU 405, I/O device interface 410, storage unit 430, network interface 415, and memory 425. The interconnect 420 may be one or more busses. The CPUs 405 may be a single CPU, multiple CPUs, or a single CPU having multiple processing cores in various embodiments. In one embodiment, a processor 405 may be a DSP. Memory 425 is generally included to be representative of a random access memory, e.g., SRAM, DRAM, or Flash. The storage 430 is generally included to be representative of a non-volatile memory, such as a hard disk drive, solid state device (SSD), removable memory cards, optical storage, flash memory devices, network attached storage (NAS), connections to storage area-network (SAN) devices, or to the cloud. The network interface 415 is configured to transmit data via the communications network 120.

The compiler system 102 may include one or more operating systems 432. An operating system 432 may be stored partially in memory 425 and partially in storage 430. Alternatively, an operating system may be stored entirely in memory 425 or entirely in storage 430. The operating system provides an interface between various hardware resources, including the CPU 405, and processing elements and other components of the stream computing application. In addition, an operating system provides common services for application programs, such as providing a time function.

The memory 425 may store a compiler 136. The compiler 136 compiles modules, which include source code or statements, into the object code, which includes machine instructions that execute on a processor. In one embodiment, the compiler 136 may translate the modules into an intermediate form before translating the intermediate form into object code. The compiler 136 may output a set of deployable artifacts that may include a set of processing elements and an application description language file (ADL file), which is a configuration file that describes the stream computing application. In embodiments, a streams application bundle or streams application bundle file may be created. In some embodiments, the compiler 136 may be a just-in-time compiler that executes as part of an interpreter. In other embodiments, the compiler 136 may be an optimizing compiler. In various embodiments, the compiler 136 may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both. The output of the compiler 136 may be represented by an operator graph, e.g., the operator graph 335.

The compiler 136 may also provide the application administrator with the ability to optimize performance through profile-driven fusion optimization. Fusing operators may improve performance by reducing the number of calls to a transport. While fusing stream operators may provide faster communication between operators than is available using inter-process communication techniques, any decision to fuse operators requires balancing the benefits of distributing processing across multiple compute processes with the benefit of faster inter-operator communications. The compiler 136 may automate the fusion process to determine how to best fuse the operators to be hosted by one or more processing elements, while respecting user-specified constraints. This may be a two-step process, including compiling the application in a profiling mode and running the application, then re-compiling and using the optimizer during this subsequent compilation. The end result may, however, be a compiler-supplied deployable application with an optimized application configuration.

Figure 5:
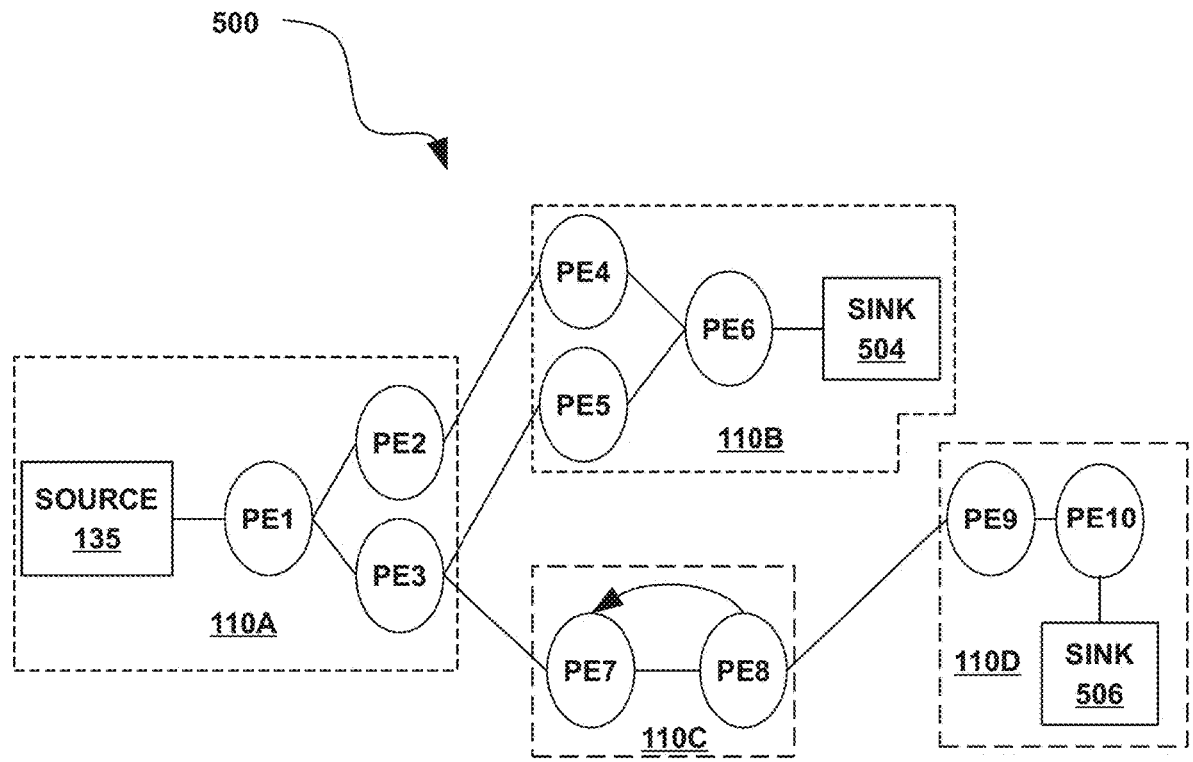
FIG. 5 illustrates an exemplary operator graph for a stream computing application according to embodiments.

FIG. 5 illustrates an exemplary operator graph 500 for a stream computing application beginning from one or more sources 135 through to one or more sinks 504, 506, according to some embodiments. This flow from source to sink may also be generally referred to herein as an execution path. In addition, a flow from one processing element to another may be referred to as an execution path in various contexts. Although FIG. 5 is abstracted to show connected processing elements PE1-PE10, the operator graph 500 may include data flows between stream operators 240 (FIG. 2) within the same or different processing elements. Typically, processing elements, such as processing element 235 (FIG. 2), receive tuples from the stream as well as output tuples into the stream (except for a sink—where the stream terminates, or a source—where the stream begins). While the operator graph 500 includes a relatively small number of components, an operator graph may be much more complex and may include many individual operator graphs that may be statically or dynamically linked together.

The example operator graph shown in FIG. 5 includes ten processing elements (labeled as PE1-PE10) running on the compute nodes 110A-110D. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. Inter-process communication paths used for inter-process communications can be a critical resource in a stream computing application. However, when stream operators are fused together, the fused stream operators can use more rapid communication techniques for passing tuples among stream operators in each processing element.

The operator graph 500 begins at a source 135 and ends at a sink 504, 506. Compute node 110A includes the processing elements PE1, PE2, and PE3. Source 135 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Tuples that flow to PE2 are processed by the stream operators contained in PE2, and the resulting tuples are then output to PE4 on compute node 110B. Likewise, the tuples output by PE4 flow to operator sink PE6 504. Similarly, tuples flowing from PE3 to PE5 also reach the operators in sink PE6 504. Thus, in addition to being a sink for this example operator graph, PE6 could be configured to perform a join operation, combining tuples received from PE4 and PE5. This example operator graph also shows tuples flowing from PE3 to PE7 on compute node 110C, which itself shows tuples flowing to PE8 and looping back to PE7. Tuples output from PE8 flow to PE9 on compute node 110D, which in turn outputs tuples to be processed by operators in a sink processing element, for example PE10 506.

Processing elements 235 (FIG. 2) may be configured to receive or output tuples in various formats, e.g., the processing elements or stream operators could exchange data marked up as XML documents. Furthermore, each stream operator 240 within a processing element 235 may be configured to carry out any form of data processing functions on received tuples, including, for example, writing to database tables or performing other database operations such as data joins, splits, reads, etc., as well as performing other data analytic functions or operations.

The stream manager 134 of FIG. 1 may be configured to monitor a stream computing application running on compute nodes, e.g., compute nodes 110A-110D, as well as to change the deployment of an operator graph, e.g., operator graph 132. The stream manager 134 may move processing elements from one compute node 110 to another, for example, to manage the processing loads of the compute nodes 110A-110D in the computing infrastructure 100. Further, stream manager 134 may control the stream computing application by inserting, removing, fusing, un-fusing, or otherwise modifying the processing elements and stream operators (or what tuples flow to the processing elements) running on the compute nodes 110A-110D.

Because a processing element may be a collection of fused stream operators, it is equally correct to describe the operator graph as one or more execution paths between specific stream operators, which may include execution paths to different stream operators within the same processing element. FIG. 5 illustrates execution paths between processing elements for the sake of clarity.

Figure 6:
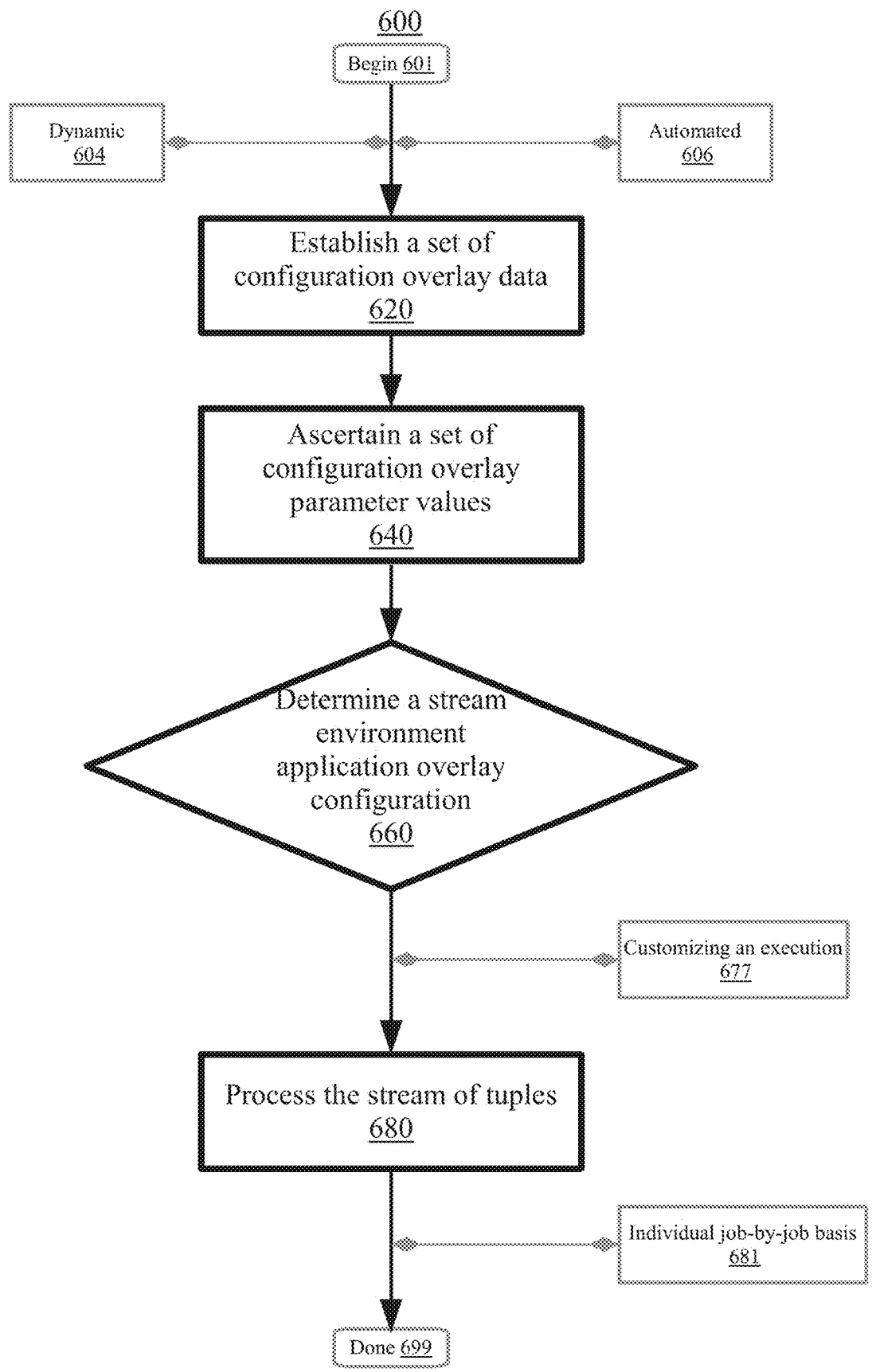
FIG. 6 is a flowchart illustrating a method of configuration management in a stream computing environment to process a stream of tuples using a compiled application bundle, according to embodiments.

FIG. 6 is a flowchart illustrating a method 600 of configuration management in a stream computing environment to process a stream of tuples using a compiled application bundle, according to embodiments. Aspects of the method 600 relate to determining a stream environment application overlay configuration to facilitate processing of a stream of tuples in a stream computing environment. The stream computing environment may include a platform for dynamically delivering and analyzing data in real-time. The stream computing environment may include an operator graph having a plurality of stream operators (e.g., filter operations, sort operators, join operators) and processing elements configured to perform processing operations on tuples flowing through the operator graph. The stream of tuples may be processed using the compiled application bundle. The compiled application bundle may include a stream computing software application or other executable computing artifact that has been compiled (e.g., converted, translated) from a set of source code in a high-level programming language to a machine-readable low-level language (e.g., assembly language or machine code). Altogether, leveraging a stream environment application overlay configuration with respect to the compiled application bundle may be associated with benefits such as stream computing application flexibility, resource usage efficiency, and tuple processing performance. Method 600 may begin at block 601.

In embodiments, the establishing, the ascertaining, the determining, the processing, and the other steps described herein may each be executed in a dynamic fashion at block 604. The steps described herein may be executed in a dynamic fashion to streamline configuration management in the stream computing environment. For instance, the establishing, the ascertaining, the determining, the processing, and the other steps described herein may occur in real-time, ongoing, or on-the-fly. As an example, one or more steps described herein may be performed in real-time (e.g., stream environment application overlay configurations may be dynamically determined for compiled application bundles as configuration overlay parameter values become available) in order to streamline (e.g., facilitate, promote, enhance) configuration management in the stream computing environment. Other methods of performing the steps described herein are also possible.

In embodiments, the establishing, the ascertaining, the determining, the processing, and the other steps described herein may each be executed in an automated fashion at block 606. The steps described herein may be executed in an automated fashion without user intervention. In embodiments, the establishing, the ascertaining, the determining, the processing, and the other steps described herein may be carried-out by an internal configuration management module maintained in a persistent storage device of a local computing device (e.g., network node). In embodiments, the establishing, the ascertaining, the determining, the processing, and the other steps described herein may be carried-out by an external configuration management module hosted by a remote computing device or server (e.g., server accessible via a subscription, usage-based, or other service model). In this way, aspects of configuration management in the stream computing environment may be performed using automated computing machinery without manual action. Other methods of performing the steps described herein are also possible.

At block 620, a set of configuration overlay data may be established. The set of configuration overlay data may include a set of configuration overlay parameters. The establishing may be performed separate from the compiled application bundle. The establishing may be performed for utilization with respect to execution of the compiled application bundle. Generally, establishing can include creating, instantiating, constructing, formulating, building, structuring, producing, assembling, or otherwise generating the set of configuration overlay data which includes the set of configuration overlay parameters. The set of configuration overlay data may include a collection of information that designates, defines, or otherwise characterizes one or more provisional (e.g., candidate, tentative) operation configurations for the compiled application bundle. As examples, the set of configuration overlay data may include information regarding desirable host pool configurations for a particular compiled application bundle, specify how stream operators should be fused, how processing elements should be allocated to hosts, and the like. In embodiments, the set of configuration overlay data may be separate from the compiled application bundle. For instance, the set of configuration overlay data may be maintained in a separate file not included in the compiled application bundle (e.g., not compiled together with the application). As described herein, the set of configuration overlay data may include a set of configuration overlay parameters. The set of configuration overlay parameters may include features, properties, or attributes that indicate types, categories, classifications or other aspects of the set of configuration overlay data. As examples, the set of configuration overlay parameters may include categories of hostpool configuration instructions (e.g., how host hardware should be configured for an application), partition co-location instructions (e.g., which stream operators or processing elements should be placed on the same host), host isolation (e.g., which stream operators or processing elements should be placed on separate hosts), job identification parameters (e.g., job name), fusion policies (e.g., which operators should be fused together or not fused together) or the like. In embodiments, establishing the set of configuration overlay data may include identifying a configuration template that defines the set of configuration overlay parameters for the compiled application bundle based on the function and purpose of the compiled application bundle. In embodiments, establishing the set of configuration overlay data may include examining (e.g., parsing) a set of code components of the compiled application bundle (e.g., either before or after compilation) to assemble the set of configuration overlay data based on the structure (e.g., type and sequence of code components, interdependencies of code modules) of the compiled application data. Other methods of establishing the set of configuration overlay data which includes the set of configuration overlay parameters are also possible.

At block 640, a set of configuration overlay parameter values for the set of configuration overlay parameters may be ascertained. The ascertaining may be performed with respect to the set of configuration overlay data. Generally, ascertaining can include formulating, resolving, identifying, receiving, collecting, or otherwise determining the set of configuration overlay parameter values for the set of configuration overlay parameters. The set of configuration overlay parameter values may include particular instructions, arrangements, or settings for a specific configuration overlay parameter of the set of configuration overlay data. The set of configuration overlay parameter values may indicate actions, commands, or directives to perform a configuration operation with respect to the compiled application bundle. As examples, the set of configuration parameter values may include commands to fuse two or more stream operators into a processing element, define a name for a job, deploy a stream operator to a designated host, allocate resources to a job, prevent certain types of stream operators from fusing or being placed on the same host, convert operator tags from one type to another, or the like. In embodiments, ascertaining the set of configuration overlay parameter values may include examining the compiled application bundle with respect to one or more sets of role perspective data (e.g., from application developers, instance administrators, performance tuners) in order to determine a plurality of configuration overlay parameter values for the set of configuration overlay parameters in a variety of contexts. For instance, the compiled application bundle may be evaluated with respect to a set of development-oriented data, a set of instance-oriented data, or a set of performance-oriented data to determine sets of configuration overlay parameter values for the set of configuration overlay parameters in development, instance administration, and execution contexts, respectively. As an example, a compiled application bundle may be analyzed with respect to a set of development-oriented data to determine a configuration overlay parameter value that indicates fusion of two particular stream operators with respect to a configuration overlay parameter of "operator fusion." Other methods of ascertaining the set of configuration overlay parameter values for the set of configuration overlay parameters are also possible.

At block 660, a stream environment application overlay configuration may be determined. The determining may be performed based on the set of configuration overlay parameter values for the set of configuration overlay parameters. Generally, determining can include formulating, resolving, computing, selecting, calculating, identifying, or otherwise ascertaining the stream environment application overlay configuration. The stream environment application overlay configuration may include a collection of parameters, criteria, and settings that define an operational arrangement (e.g., configuration) for the compiled application bundle in the stream computing environment. For instance, the stream environment application overlay configuration may designate specific stream operators for fusion, indicate processing elements for placement on particular hosts, specify hostpool configurations for hosting the compiled application bundle, and the like. As described herein, the stream environment application overlay configuration may be determined based on the set of configuration overlay parameter values. In embodiments, determining the stream environment application overlay configuration may include analyzing the set of configuration overlay parameter values and generating a suggested or recommended configuration for operation of the compiled application bundle in the stream computing environment. In certain embodiments, determining the stream environment application overlay configuration may include aggregating one or more sets of configuration overlay parameter values (e.g., for development-oriented contexts, instance-oriented contexts, and performance-oriented contexts, respectively), and combining them to assemble the stream environment application overlay for the compiled application bundle. As an example, a first set of configuration overlay parameter values that indicates fusion of a first stream operator and a second stream operator may be combined with a second set of configuration overlay parameter values that indicates deployment of the first stream operator to a first host to determine a stream application overlay configuration that recommends fusion of the first stream operator and second stream operator and deployment of the resulting processing element to the first host. In certain embodiments, determining may include receiving a user input via a graphical user interface (e.g., of an integrated development environment) to identify the particular configuration overlay parameter values that should be incorporated in the stream environment application overlay configuration, or resolve issues between conflicting parameter values. Other methods of determining the stream environment application overlay configuration based on the set of configuration overlay parameter values for the set of configuration overlay parameters are also possible.

In embodiments, an execution of the compiled application bundle may be customized at block 677. The execution may be customized without a recompilation of the compiled application bundle. The customizing may be performed using the stream environment application overlay configuration based on the set of configuration overlay parameter values for the set of configuration overlay parameters. As described herein, aspects of the disclosure relate to the recognition that, in some situations, configuration information for streaming applications is established at application development time and compiled together with the application, which may adversely impact the flexibility of the application for the administrators, performance tuners, and other end-users of the stream computing application (e.g., end users may not be able to adjust the configuration of the application to adapt it to a specific usage context). Accordingly, aspects of the disclosure relate to customizing execution of the compiled application bundle without requiring access to source code or recompiling the application. Generally, customizing can include altering, developing, revising, designing, adapting, or otherwise modifying the execution of the compiled application bundle. In embodiments, customizing may include adapting one or more execution parameters, hostpool configuration, stream operator fusion/co-location policies, asset placement arrangements, or resource allocations with respect to the compiled application bundle. As an example, for an execution environment in which memory resources are constrained, customizing may include prioritizing usage of stream operators that have a low memory footprint and favor processor resources over memory. As such, execution of the compiled application bundle may be tailored to the specific needs and considerations of individual stream computing environments without the need for recompilation. Other methods of customizing execution of the compiled application bundle are also possible.

At block 680, the stream of tuples may be processed in the stream computing environment. The processing may be performed using the stream environment application overlay configuration when executing the compiled application bundle. Generally, processing can include analyzing, evaluating, altering, investigating, examining, modifying, or otherwise managing the stream of tuples using the stream environment application overlay configuration. Processing the stream of tuples may include applying the stream environment application overlay configuration to a compiled application bundle to facilitate performing one or more processing operations on the stream of tuples to convert input tuples to output tuples. In embodiments, processing may include superimposing (e.g., overlaying, applying) the stream environment application overlay configuration with respect to a stream operator graph or internal topology model, and subsequently performing a series of processing operations on the stream of tuples as indicated by the stream environment application overlay configuration. As an example, consider that a stream environment application overlay configuration indicates that a first group of stream operators are recommended for co-location on a particular hostpool, and that tuples processed by the first group of stream operators should be tagged with a timestamp to indicate the time they were processed. The stream environment application overlay configuration may be applied to the compiled application bundle in the stream computing environment such that the first group of stream operators are deployed for co-location on the designated hostpool and configured to tag processed tuples with the timestamp. Accordingly, the stream of tuples may be routed to the first hostpool to be processed by the first group of stream operators and receive the timestamp. Other methods of processing the stream of tuples in the stream computing environment using the stream environment application overlay configuration when executing the compiled application bundle are also possible.

In embodiments, the configuration management may be performed on an individual job-by-job basis at block 681. The configuration management may be performed to utilize job-specific stream environment application overlay configurations for streams processing using the compiled application bundle without the recompilation of the compiled application bundle. Generally, performing can include implementing, instantiating, initiating, utilizing, running, or otherwise executing the configuration management on an individual job-by-job basis. The job-specific stream environment application overlay configurations may include stream environment application overlay configurations that are specifically adapted for the individual characteristics of a given application of a compiled application bundle. In embodiments, performing the configuration management on a job-by-job basis may include determining job-specific stream environment application overlay configurations for a plurality of compiled application bundles based on the type, function, and purpose of the jobs (e.g., tasks, operations) performed by each stream computing application in one or more application contexts. As an example, consider a compiled application bundle configured to perform statistical analysis operations with respect to received data. Accordingly, performing configuration management on an individual job-by-job basis may include determining separate stream environment application overlay configurations for the compiled application bundle based on the context in which the compiled application bundle is used, such that a first stream environment application overlay configuration may be used when processing Internet-of-Things data (e.g., where tuple processing speed may be prioritized to provide real-time results) and a second stream environment application overlay configuration may be used when processing relational database data (e.g., where data integrity may be prioritized over processing speed). Other methods of performing configuration management on an individual job-by-job basis are also possible.

Consider the following example. A compiled application bundle may relate to a stream computing application for financial transaction management. As described herein, a set of configuration overlay data which includes a set of configuration overlay parameters may be established separate from the compiled application bundle. In embodiments, the compiled application bundle may be examined with respect to a set of development-oriented data, a set of instance-oriented data, and a set of performance-oriented data to ascertain a set of configuration overlay parameter values for the set of configuration overlay parameters. For instance, based on the set of development-oriented data a configuration overlay parameter value that indicates partition co-location of a first operator and a second operator may be ascertained, based on the set of instance-oriented data a configuration overlay parameter value that indicates a hostpool tag conversion operation from "Red" tags to "Blue" tags may be ascertained, and based on the set of performance-oriented data a configuration overlay parameter value that indicates a partition co-location of a third operator and a fourth operator may be ascertained. Based on the set of configuration overlay parameter values for the set of configuration overlay parameters, a stream environment application overlay configuration may be determined. As an example, in certain embodiments, the individual configuration overlay parameter values may be combined to assemble the stream environment application overlay configuration. In certain embodiments, separate stream environment application overlay configurations may be created for usage in different contexts. Accordingly, the stream environment application overlay configuration may be applied to customize execution of the compiled application bundle in the stream computing environment. For instance, as indicated by the set of configuration overlay parameters, the first and second stream operators may be deployed to a first host, the hostpool tag conversion operation may be performed to convert "Red" tags to "Blue" tags, and the third and fourth stream operators may be placed together on a second host. Other methods of configuration management in the stream computing environment are also possible.

Method 600 concludes at block 699. Aspects of method 600 may provide performance or efficiency benefits related to configuration management. As an example, determining stream environment application overlay configurations may allow for modification of the operational configuration of a stream computing application without the need for recompilation, allowing the stream computing application to be adapted to different usage contexts. Altogether, leveraging a stream environment application overlay configuration with respect to a compiled application bundle may be associated with benefits such as stream computing application flexibility, resource usage efficiency, and tuple processing performance. Aspects may save resources such as bandwidth, disk, processing, or memory.

Figure 7:
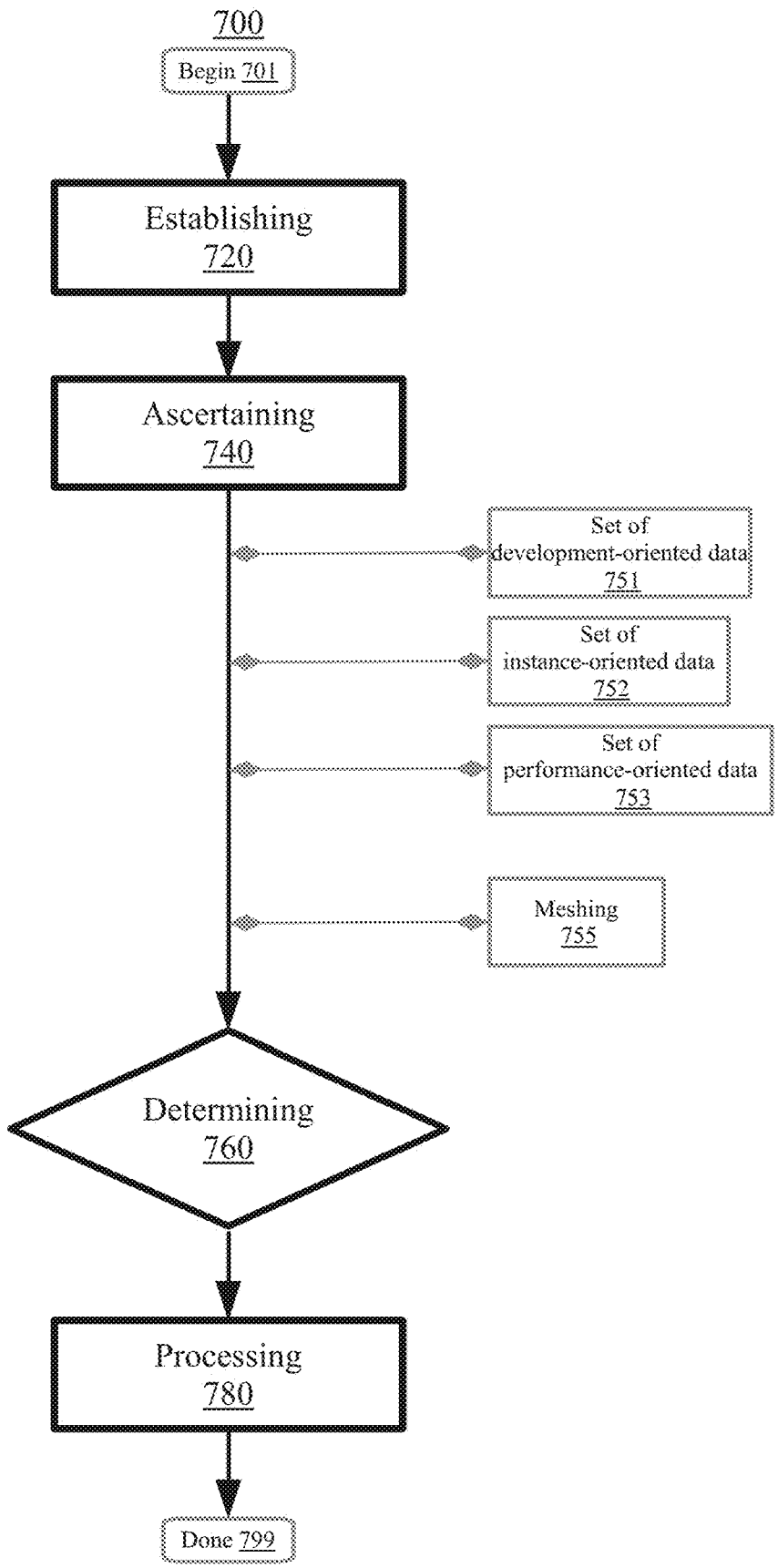
FIG. 7 is a flowchart illustrating a method of configuration management in a stream computing environment to process a stream of tuples using a compiled application bundle, according to embodiments.

FIG. 7 is a flowchart illustrating a method 700 of configuration management in a stream computing environment to process a stream of tuples using a compiled application bundle, according to embodiments. Aspects of FIG. 7 relate to determining a stream environment application overlay configuration based on a set of role perspective data. The set of role perspective data may include one or more of a set of development-oriented data, a set of instance-oriented data, or a set of performance-oriented data. Aspects of method 700 may be similar or the same as method 600, and aspects may be utilized interchangeably. The method 700 may begin at block 701.

At block 720, a set of configuration overlay data may be established. The set of configuration overlay data may include a set of configuration overlay parameters. The establishing may be performed separate from the compiled application bundle. The establishing may be performed for utilization with respect to execution of the compiled application bundle. At block 740, a set of configuration overlay parameter values for the set of configuration overlay parameters may be ascertained. The ascertaining may be performed with respect to the set of configuration overlay data.

In embodiments, a set of development-oriented data may be ascertained for the set of configuration overlay parameter values for the set of configuration overlay parameters at block 751. The ascertaining may be performed with respect to the set of configuration overlay data. Generally, ascertaining can include formulating, resolving, identifying, receiving, collecting, or otherwise determining the set of development-oriented data. The set of development-oriented data may include a collection of information that describes, defines, or otherwise characterizes the operational requirements and conditions, internal structure, and technical framework of a compiled application bundle. For instance, the set of development-oriented data may relate to the development environment in which the compiled application bundle was created, upper and lower performance thresholds achievable by the compiled application bundle, the behavior of the compiled application bundle in different contexts, resource requirements, compatible running environments, and the like. In embodiments, ascertaining may include analyzing a set of source code corresponding to the compiled application bundle to extract the set of development-oriented data. In embodiments, ascertaining may include receiving the set of development-oriented data from a user (e.g., application developer). In embodiments, the stream environment application overlay configuration may be determined. The determining may be performed based on the set of development-oriented data for the set of configuration overlay parameter values for the set of configuration overlay parameters. Generally, determining can include formulating, resolving, computing, selecting, calculating, identifying, or otherwise ascertaining the stream environment application overlay configuration based on the set of development-oriented data. In embodiments, determining may include evaluating the set of development-oriented data to generate a suggested or recommended configuration for operation of the compiled application bundle in the stream computing environment. For instance, in certain embodiments, the resource requirements, performance thresholds, application behavior, and other characteristics of the compiled application bundle may be used to determine host pools that that are expected to be associated with performance benefits with respect to the compiled application bundle in the stream computing environment. Other methods of ascertaining the set of development-oriented data and determining the stream environment application overlay configuration based on the set of development-oriented data are also possible.

In embodiments, a set of instance-oriented data may be ascertained for the set of configuration overlay parameter values for the set of configuration overlay parameters at block 752. The ascertaining may be performed with respect to the set of configuration overlay data. Generally, ascertaining can include formulating, resolving, identifying, receiving, collecting, or otherwise determining the set of instance-oriented data. The set of instance-oriented data may include a collection of information that describes, defines, or otherwise characterizes the runtime requirements and conditions, goals/purposes, and workspace provisions of a compiled application bundle in a particular application instance or application context. For instance, the set of instance-oriented data may relate to the runtime environment in which the compiled application bundle is intended to be used, the resource availability of the environment, the priority of the compiled application bundle with respect to other running applications, target performance levels, dependencies/relationships between the compiled application bundle and other applications, and security management of the compiled application bundle. In embodiments, ascertaining may include analyzing the runtime environment of the compiled application bundle to extract the set of instance-oriented data. In embodiments, ascertaining may include receiving the set of instance-oriented data from a user (e.g., instance administrator). In embodiments, the stream environment application overlay configuration may be determined. The determining may be performed based on the set of instance-oriented data for the set of configuration overlay parameter values for the set of configuration overlay parameters. Generally, determining can include formulating, resolving, computing, selecting, calculating, identifying, or otherwise ascertaining the stream environment application overlay configuration based on the set of instance-oriented data. In embodiments, determining may include evaluating the set of instance-oriented data to adapt or tailor the compiled application bundle to an individual usage instance of a particular runtime environment. As an example, in certain embodiments, the resource availability, relation between the compiled application bundle and other concurrently running applications, target performance levels, and other characteristics of the compiled application bundle may be used to determine host pool tagging requirements that are expected to be associated with performance benefits with respect to the compiled application bundle in the individual usage instance of the runtime environment. Other methods of ascertaining the set of instance-oriented data and determining the stream environment application overlay configuration based on the set of instance-oriented data are also possible.

In embodiments, a set of performance-oriented data may be ascertained for the set of configuration overlay parameter values for the set of configuration overlay parameters at block 753. The ascertaining may be performed with respect to the set of configuration overlay data. Generally, ascertaining can include formulating, resolving, identifying, receiving, collecting, or otherwise determining the set of performance-oriented data. The set of performance-oriented data may include a collection of information that describes, defines, or otherwise characterizes the performance characteristics, scalability, and operational efficiency of a compiled application bundle in a particular application instance or application context. For instance, the set of performance-oriented data may relate to the runtime environment in which the compiled application bundle is intended to be used, the operational parameters/settings of system components (e.g., stream operator settings), the workload-balancing strategy employed with respect to the compiled application bundle, bottlenecks encountered by the compiled application bundle, job scheduling, and resource management of the compiled application bundle. In embodiments, ascertaining the set of performance-oriented data may include performing iterative testing of the compiled application bundle to identify a set of tuning factors that can be modified to adjust system performance (e.g., resource allocation, job scheduling order, operator fusion, host placement). In embodiments, ascertaining may include receiving the set of performance-oriented data from a user (e.g., performance tuner). In embodiments, the stream environment application overlay configuration may be determined. The determining may be performed based on the set of performance-oriented data for the set of configuration overlay parameter values for the set of configuration overlay parameters. Generally, determining can include formulating, resolving, computing, selecting, calculating, identifying, or otherwise ascertaining the stream environment application overlay configuration based on the set of performance-oriented data. In embodiments, determining may include evaluating the set of performance-oriented data to generate a suggested or recommended configuration for operation of the compiled application bundle in the stream computing environment. As an example, in certain embodiments, the operational parameters of one or more stream operators, the bottlenecks encountered by the compiled application bundle, the resource availability of available hosts, and other characteristics of the compiled application bundle may be used to determine a stream operator fusion policy that is expected to be associated with performance benefits with respect to the compiled application bundle in the stream computing environment. Other methods of ascertaining the set of performance-oriented data and determining the stream environment application overlay configuration based on the set of performance-oriented data are also possible.

In embodiments, a first configuration overlay parameter value of the set of configuration overlay parameter values for a first configuration overlay parameter of the set of configuration overlay parameters may be meshed with a second configuration overlay parameter value of the set of configuration overlay parameter values for the first configuration overlay parameter of the set of configuration overlay parameters at block 755. The meshing may be performed to determine the stream environment application overlay configuration. Generally, meshing can include joining, linking, uniting, associating, relating, merging, coupling, or otherwise combining a first configuration overlay parameter value with a second configuration overlay parameter value. As described herein, in certain embodiments, determining the stream environment application overlay configuration may include combining a plurality of configuration overlay parameter values to generate a stream environment application overlay configuration that incorporates the features and attributes of each incorporated parameter value. In embodiments, meshing may include joining configuration overlay parameter values corresponding to different configuration overlay parameters (e.g., a parameter value for a parameter of "hostpool config instruction" may be combined with a parameter value for a parameter of "host isolation"). In certain embodiments, meshing may include joining configuration overlay parameter values corresponding to the same configuration overlay parameters (e.g., multiple parameters values corresponding to partition co-location may be joined together). As an example, consider that a first configuration overlay parameter value indicates a partition co-location operation with respect to a first operator, a second operator, and a third operator (e.g., the designated operators should be placed on the same host), and that a second configuration overlay parameter value indicates a partition co-location operation with respect to a fourth operator and a fifth operator. Accordingly, meshing may include merging the first configuration overlay parameter value with the second configuration overlay parameter value to determine a stream environment application overlay configuration to perform both the first partition co-location operation with respect to the first, second, and third operators as well as the second partition co-location operation with respect to the fourth and fifth operators. Other methods of meshing configuration overlay parameter values to determine the stream environment application overlay configuration are also possible.

At block 760, a stream environment application overlay configuration may be determined. The determining may be performed based on the set of configuration overlay parameter values for the set of configuration overlay parameters. At block 780, the stream of tuples may be processed in the stream computing environment. The processing may be performed using the stream environment application overlay configuration when executing the compiled application bundle.

Method 700 concludes at block 799. Aspects of method 700 may provide performance or efficiency benefits related to configuration management. Aspects may save resources such as bandwidth, disk, processing, or memory. Altogether, leveraging a stream environment application overlay configuration with respect to a compiled application bundle may be associated with benefits such as stream computing application flexibility, resource usage efficiency, and tuple processing performance.

Figure 8:
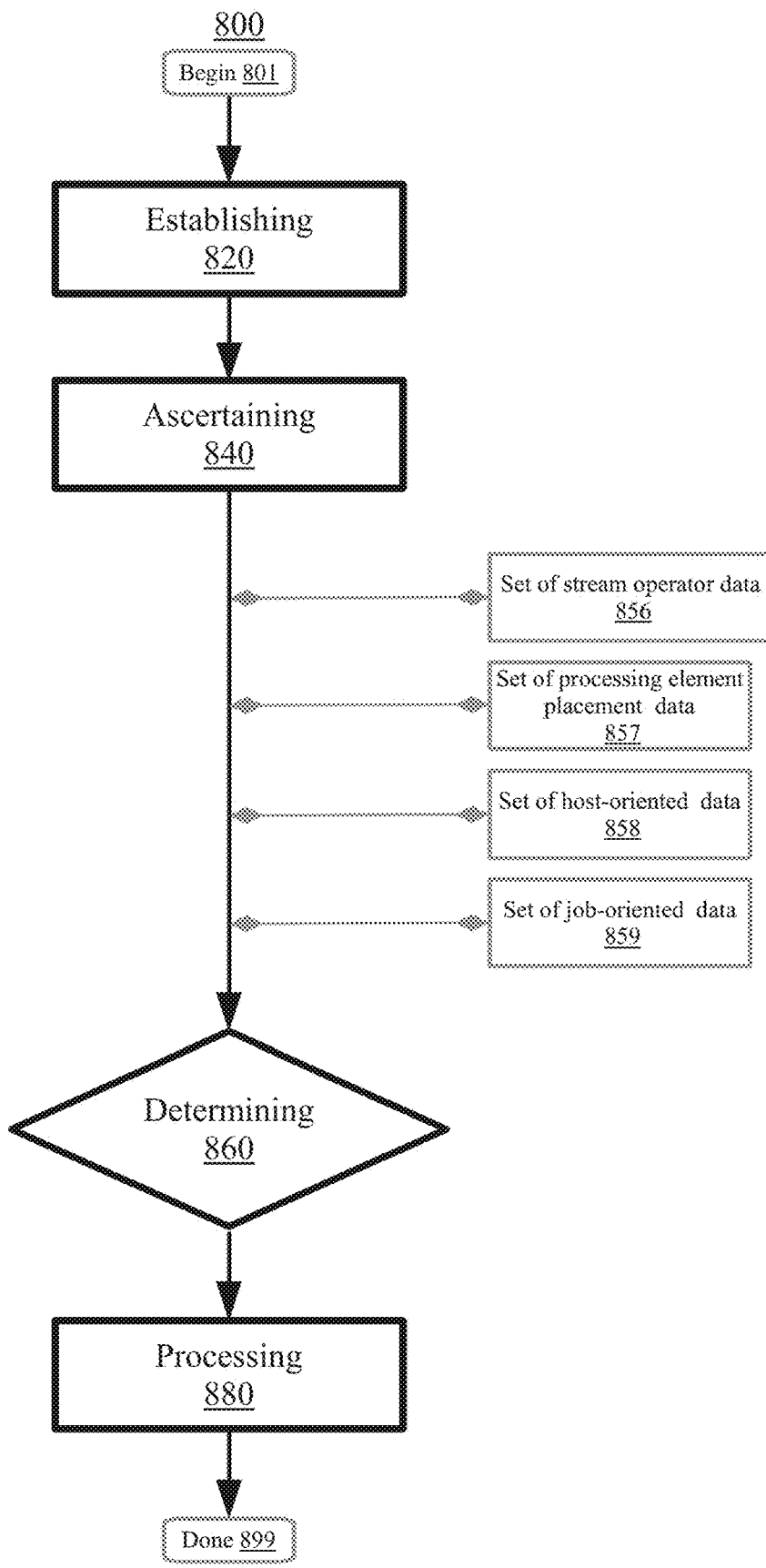
FIG. 8 is a flowchart illustrating a method of configuration management in a stream computing environment to process a stream of tuples using a compiled application bundle, according to embodiments.

FIG. 8 is a flowchart illustrating a method 800 of configuration management in a stream computing environment to process a stream of tuples using a compiled application bundle, according to embodiments. Aspects of the method 800 relate to determining the stream environment application overlay configuration based on one or more types of configuration overlay parameters for a compiled application bundle. For instance, the stream environment application overlay configuration may be determined based on one or more of a set of stream operator data, a set of processor element placement data, a set of host-oriented data, or a set of job-oriented data. Aspects of method 800 may be similar or the same as method 600/700, and aspects may be utilized interchangeably. The method 800 may begin at block 801.

At block 820, a set of configuration overlay data may be established. The set of configuration overlay data may include a set of configuration overlay parameters. The establishing may be performed separate from the compiled application bundle. The establishing may be performed for utilization with respect to execution of the compiled application bundle. At block 840, a set of configuration overlay parameter values for the set of configuration overlay parameters may be ascertained. The ascertaining may be performed with respect to the set of configuration overlay data.

In embodiments, the set of configuration overlay data which includes the set of configuration overlay parameters for a set of stream operator parameters may be established at block 856. The establishing may be performed separate from the compiled application bundle for utilization with respect to execution of the compiled application bundle. Generally, establishing can include creating, instantiating, constructing, formulating, building, structuring, producing, assembling, or otherwise generating the set of configuration overlay data which includes the set of configuration overlay parameters for a set of stream operator parameters. The set of stream operator parameters may include features, properties, attributes, traits, or criteria that define the operational characteristics of one or more stream operators. For instance, the set of stream operator parameters may include stream operator fusion, stream operator resource allocation, stream operator security, stream operator host placement, or other factors that impact the configuration of stream operators in the stream computing environment. In embodiments, establishing may include evaluating stream operator profile data for each stream operator utilized in the compiled application bundle to establish the stream operator parameters. Other methods of establishing the set of stream operator parameters are also possible.

In embodiments, a set of stream operator data may be ascertained for the set of configuration overlay parameter values for the set of configuration overlay parameters. The ascertaining may be performed with respect to the set of configuration overlay data. Generally, ascertaining can include formulating, resolving, identifying, receiving, collecting, or otherwise determining the set of stream operator data for the set of configuration overlay parameter values for the set of configuration overlay parameters. In embodiments, the set of stream operator data may include a collection of information that defines or characterizes the operational configuration of the set of stream operators in the stream computing environment. For instance, the set of stream operator data may indicate requirements (e.g., necessities, preconditions), desires (e.g., ideal settings, resource allocations, running environments), or targets (e.g., goals, objectives) with respect to performance, fusion, placement, or security of one or more stream operator parameters of a set of stream operators. As examples, the set of stream operator data may indicate that a particular stream operator requires 500 megabytes of memory to function, should be prevented from fusing with "join" type operators, and has a target throughput rate of 1000 tuples per second. In embodiments, ascertaining the set of stream operator data may include analyzing a set of historical usage data for the set of stream operators to ascertain stream operator parameter configurations associated with positive performance impacts for the set of stream parameters. Other methods of ascertaining the set of stream operator data for the set of configuration overlay parameter values are also possible.

In embodiments, the stream environment application overlay configuration may be determined. The determining may be performed based on the set of stream operator data for the set of configuration overlay parameter values for the set of configuration overlay parameters. Generally, determining can include formulating, resolving, computing, selecting, calculating, identifying, or otherwise ascertaining the stream environment application overlay configuration based on the set of stream operator data. In embodiments, determining the stream environment application overlay configuration may include evaluating the set of stream operator data to generate a suggested or recommended configuration for operation of the set of stream operators in the stream computing environment. For instance, in certain embodiments, the resource requirements, operator fusion policies, and host placement preferences may be used to determine operational configurations that are expected to be associated with performance benefits with respect to the compiled application bundle in the stream computing environment. Other methods of determining the stream environment application overlay configuration are also possible.

In embodiments, the set of configuration overlay data which includes the set of configuration overlay parameters for a set of processing element placement parameters may be established at block 857. The establishing may be performed separate from the compiled application bundle for utilization with respect to execution of the compiled application bundle. Generally, establishing can include creating, instantiating, constructing, formulating, building, structuring, producing, assembling, or otherwise generating the set of configuration overlay data which includes the set of configuration overlay parameters for a set of processing element placement parameters. The set of processing element placement parameters may include features, properties, attributes, traits, or criteria that govern how a set of processing elements are to be placed on hosts of the stream computing environment. For instance, the set of processing element placement parameters may include processing element co-location, processing element isolation, processing element host placement, or other factors that impact the placement arrangement of processing elements in the stream computing environment. In embodiments, establishing may include evaluating processing element profile data for each processing element utilized in the compiled application bundle to establish the processing element placement parameters. Other methods of establishing the set of processing element placement parameters are also possible.

In embodiments, a set of processing element placement data may be ascertained for the set of configuration overlay parameter values for the set of configuration overlay parameters. The ascertaining may be performed with respect to the set of configuration overlay data. Generally, ascertaining can include formulating, resolving, identifying, receiving, collecting, or otherwise determining the set of processing element placement data for the set of configuration overlay parameter values for the set of configuration overlay parameters. In embodiments, the set of processing element data may include a collection of information that defines or characterizes the placement arrangement of the set of processing elements in the stream computing environment. For instance, the set of processing element placement data may indicate requirements (e.g., necessities, preconditions), desires (e.g., ideal settings, resource allocations, running environments), or targets (e.g., goals, objectives) with respect to placement of one or more processing elements. As examples, the set of processing element placement data may indicate that a first processing element should be isolated on a single host in order to promote debugging, a second processing element should be placed together with a plurality of processing elements on the same host to facilitate fusion, or that a third processing element be placed within a threshold proximity (e.g., host in the same local network) of a fourth processing element to save network bandwidth. In embodiments, ascertaining the set of processing element placement data may include simulating one or more candidate placement arrangements of the set of processing elements to ascertain processing element placement configurations associated with positive performance impacts for the set of processing elements. Other methods of ascertaining the set of processing element placement data for the set of configuration overlay parameter values are also possible.

In embodiments, the stream environment application overlay configuration may be determined. The determining may be performed based on the set of processing element placement data for the set of configuration overlay parameter values for the set of configuration overlay parameters. Generally, determining can include formulating, resolving, computing, selecting, calculating, identifying, or otherwise ascertaining the stream environment application overlay configuration based on the set of processing element placement data. In embodiments, determining the stream environment application overlay configuration may include evaluating the set of processing element placement data to generate a suggested or recommended configuration for placement of the set of processing elements in the stream computing environment. For instance, in certain embodiments, the co-location requirements, isolation requirements, and host placement preferences of the set of processing elements may be used to determine a processing element placement arrangement that is expected to be associated with performance benefits with respect to the compiled application bundle in the stream computing environment. Other methods of determining the stream environment application overlay configuration are also possible.

In embodiments, the set of configuration overlay data which includes the set of configuration overlay parameters for a set of host-oriented parameters may be established at block 858. The establishing may be performed separate from the compiled application bundle for utilization with respect to execution of the compiled application bundle. Generally, establishing can include creating, instantiating, constructing, formulating, building, structuring, producing, assembling, or otherwise generating the set of configuration overlay data which includes the set of configuration overlay parameters for a set of host-oriented parameters. The set of host-oriented parameters may include features, properties, attributes, traits, or criteria that characterize one or more hosts (e.g., physical computer hardware, virtual machines, containers) of the stream computing environment. For instance, the set of host-oriented parameters may include system resource availability, security protocols, workload balancing strategies, current workload levels, or other factors that impact how the hosts may support stream operators, processing elements, and other components of a stream computing application. In embodiments, establishing may include evaluating host profile data for one or more hosts of the stream computing environment to identify the requirements, attributes, conditions, characteristics, and other factors that define the set of host-oriented parameters. Other methods of establishing the set of host-oriented parameters are also possible.

In embodiments, a set of host-oriented data may be ascertained for the set of configuration overlay parameter values for the set of configuration overlay parameters. The ascertaining may be performed with respect to the set of configuration overlay data. Generally, ascertaining can include formulating, resolving, identifying, receiving, collecting, or otherwise determining the set of host-oriented data for the set of configuration overlay parameter values for the set of configuration overlay parameters. In embodiments, the set of host-oriented data may include a collection of information that defines criteria, conditions, or stipulations with respect to one or more host-oriented parameters of the set of host-oriented parameters. For instance, the set of host-oriented data may indicate requirements (e.g., necessities, preconditions), desires (e.g., ideal settings, resource allocations, running environments), or targets (e.g., goals, objectives) with respect to asset placement on one or more hosts of the stream computing environment. As examples, the set of host-oriented data may indicate that a first host has a current workload of 91% (e.g., such that it may not have the bandwidth to support additional deployments), a second host has processing resources achieving a processor availability threshold (e.g., making it suitable for processor intensive jobs), a third host has memory resources achieving a memory availability threshold (e.g., making it suitable for memory intensive tasks), a fourth host employs a particular security protocol, or the like. In embodiments, ascertaining the set of host-oriented data may include monitoring performance of a set of hosts of the stream computing environment with respect to the set of host-oriented parameters to collect the set of host-oriented data. Other methods of ascertaining the set of host-oriented data for the set of configuration overlay parameter values are also possible.

In embodiments, the stream environment application overlay configuration may be determined. The determining may be performed based on the set of host-oriented data for the set of configuration overlay parameter values for the set of configuration overlay parameters. Generally, determining can include formulating, resolving, computing, selecting, calculating, identifying, or otherwise ascertaining the stream environment application overlay configuration based on the set of host-oriented data. In embodiments, determining the stream environment application overlay configuration may include evaluating the set of host-oriented data with respect to the compiled application bundle to evaluate the compatibility or suitability of one or more hosts for hosting one or more stream operators, processing elements, or other components of the compiled application bundle. As an example, in certain embodiments, system resource availabilities, co-location/isolation requirements of stream operators, host security protocols, host workload levels, and other factors may be used to determine a host allocation arrangement that balances processing power utilization and memory utilization within predetermined thresholds across a plurality of hosts in the stream computing environment. Other methods of determining the stream environment application overlay configuration are also possible.

In embodiments, the set of configuration overlay data which includes the set of configuration overlay parameters for a set of job-oriented parameters may be established at block 859. The establishing may be performed separate from the compiled application bundle for utilization with respect to execution of the compiled application bundle. Generally, establishing can include creating, instantiating, constructing, formulating, building, structuring, producing, assembling, or otherwise generating the set of configuration overlay data which includes the set of configuration overlay parameters for a set of job-oriented parameters. The set of job-oriented parameters may include features, properties, attributes, traits, or criteria that characterize one or more jobs (e.g., tasks, steps, instructions, units of work/execution) of the compiled application bundle. For instance, the set of job-oriented parameters may include system resource usage, expected job completion time, job priority, job intensity, job execution parameters, or other factors that impact how a particular job is performed in the stream computing environment. In embodiments, establishing may include evaluating historical job performance data for one or more jobs to identify the requirements, attributes, conditions, characteristics, and other factors that define the set of job-oriented parameters. Other methods of establishing the set of job-oriented parameters are also possible.

In embodiments, a set of job-oriented data may be ascertained for the set of configuration overlay parameter values for the set of configuration overlay parameters. The ascertaining may be performed with respect to the set of configuration overlay data. Generally, ascertaining can include formulating, resolving, identifying, receiving, collecting, or otherwise determining the set of job-oriented data for the set of configuration overlay parameter values for the set of configuration overlay parameters. In embodiments, the set of job-oriented data may include a collection of information that defines criteria, conditions, or stipulations with respect to one or more job-oriented parameters of the set of job-oriented parameters. For instance, the set of job-oriented data may indicate requirements (e.g., necessities, preconditions), desires (e.g., ideal settings, resource allocations, running environments), or targets (e.g., goals, objectives) with respect to execution of one or more jobs in the stream computing environment. As examples, the set of job-oriented data may indicate that a first job is configured to run in a resource-saving mode (e.g., configuration to prioritize resource savings over performance) during a first time period (e.g., 12:00 AM to 7:00 AM), a high-performance mode (e.g., configuration where data is processed using stricter parameters to expedite tuple output) during a second time period (e.g., 1:00 PM to 4:00 PM), has a target resource usage of 50 megabytes of memory and 1.1 gigahertz of processing resources, and the like. In embodiments, ascertaining the set of job-oriented data may include monitoring performance of a set of jobs of the stream computing environment with respect to the set of job-oriented parameters to collect the set of job-oriented data. Other methods of ascertaining the set of job-oriented data for the set of configuration overlay parameter values are also possible.

In embodiments, the stream environment application overlay configuration may be determined. The determining may be performed based on the set of job-oriented data for the set of configuration overlay parameter values for the set of configuration overlay parameters. Generally, determining can include formulating, resolving, computing, selecting, calculating, identifying, or otherwise ascertaining the stream environment application overlay configuration based on the set of job-oriented data. In embodiments, determining the stream environment application overlay configuration may include evaluating the set of job-oriented data with respect to the hostpool configuration, job resource requirements, job priority, and host resource availability to evaluate the compatibility or suitability of one or more hosts for facilitating execution of a particular job. For instance, consider again the job described in the previous example that is configured to run in the resource-saving mode during a first time period and the high-performance mode during the second time period. In embodiments, the resource-saving mode may have target resource requirements of 1.8 gigahertz of processor resources and 2 gigabytes of memory, and the high-performance mode may have target resource requirements of 2.6 gigahertz of processor resources and 3.1 gigabytes of memory. Accordingly, resource requirements of the job may be compared with respect to the available hosts, and a host may be identified that supports adaptive execution of the job in both the resource-saving mode and the high-performance mode. Other methods of determining the stream environment application overlay configuration are also possible.

At block 860, a stream environment application overlay configuration may be determined. The determining may be performed based on the set of configuration overlay parameter values for the set of configuration overlay parameters. At block 880, the stream of tuples may be processed in the stream computing environment. The processing may be performed using the stream environment application overlay configuration when executing the compiled application bundle.

Method 800 concludes at block 899. Aspects of method 800 may provide performance or efficiency benefits related to configuration management. Altogether, leveraging a stream environment application overlay configuration with respect to a compiled application bundle may be associated with benefits such as stream computing application flexibility, resource usage efficiency, and tuple processing performance. Aspects may save resources such as bandwidth, disk, processing, or memory.

Figure 9:
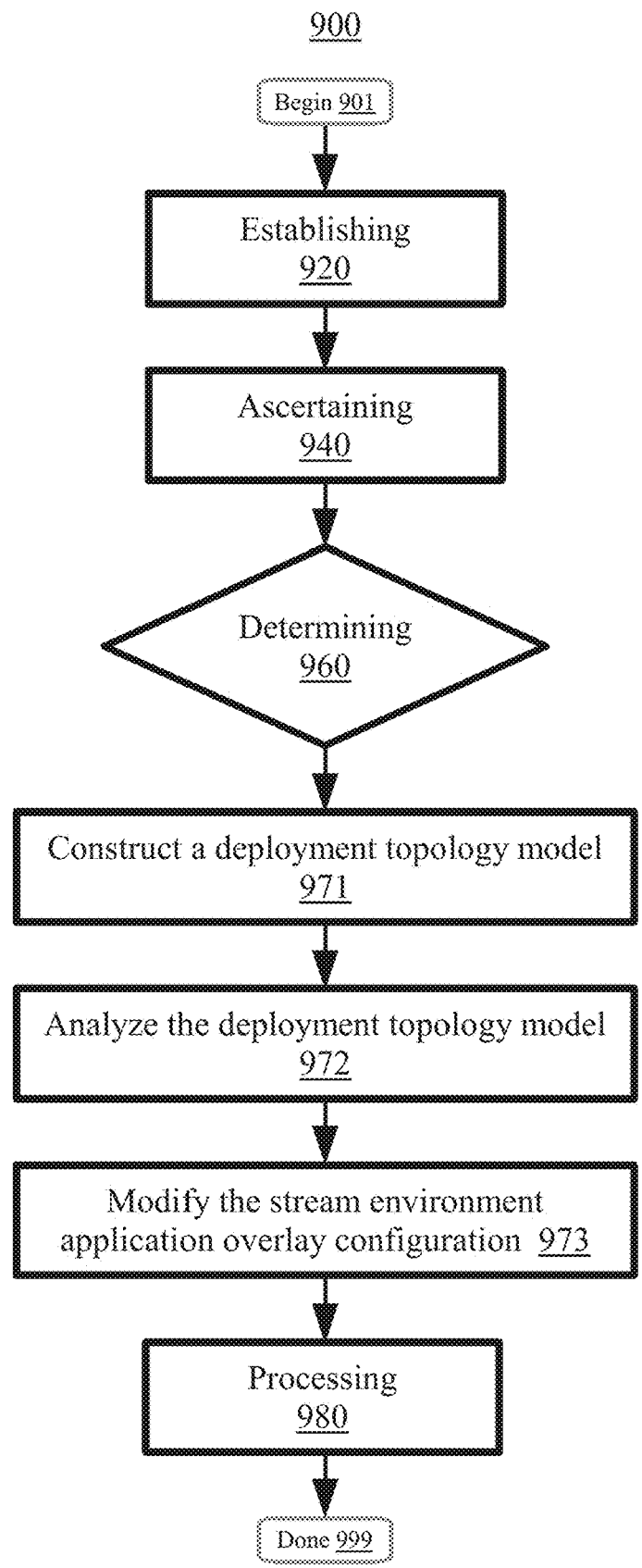
FIG. 9 is a flowchart illustrating a method of configuration management in a stream computing environment to process a stream of tuples using a compiled application bundle, according to embodiments.

FIG. 9 is a flowchart illustrating a method 900 of configuration management in a stream computing environment to process a stream of tuples using a compiled application bundle, according to embodiments. Aspects of the method 900 relate to modifying a stream environment application overlay configuration based on analysis of a deployment topology model in advance of processing a stream of tuples in the stream computing environment. Aspects of method 900 may be similar or the same as method 600/700/800, and aspects may be utilized interchangeably. The method 900 may begin at block 901.

At block 920, a set of configuration overlay data may be established. The set of configuration overlay data may include a set of configuration overlay parameters. The establishing may be performed separate from the compiled application bundle. The establishing may be performed for utilization with respect to execution of the compiled application bundle. At block 940, a set of configuration overlay parameter values for the set of configuration overlay parameters may be ascertained. The ascertaining may be performed with respect to the set of configuration overlay data. At block 960, a stream environment application overlay configuration may be determined. The determining may be performed based on the set of configuration overlay parameter values for the set of configuration overlay parameters.

At block 971, a deployment topology model may be constructed. The constructing may be performed in advance of processing the stream of tuples in the stream computing environment. The constructing may be performed based on the stream environment application overlay configuration. Generally, constructing can include building, creating, assembling, forming, establishing, generating, or otherwise structuring the deployment topology model. The deployment topology model may include a representation of the arrangement or structure of the physical and logical elements of the stream computing environment. For instance, the deployment topology model may illustrate which stream operators and processing elements are allocated to which physical and virtual hosts, how streams of tuples would be routed and processed by the stream computing environment, estimated resource requirements for scheduled jobs, tag configurations for hostpools, and other configuration parameters in the stream computing environment. In embodiments, constructing the deployment topology model may include generating a simulated representation of the stream computing environment based on the stream environment application overlay configuration to provide a preview of the configuration that would result from implementation of the stream environment application overlay configuration. In certain embodiments, constructing may displaying a visual presentation of the deployment topology model within a graphical interface prior to actual tuple processing in the stream computing environment (e.g., to facilitate evaluation/experimentation of different configuration settings with respect to the stream computing environment). Other methods of constructing the deployment topology model based on the stream environment application overlay configuration are also possible.

At block 972, the deployment topology model may be analyzed. The analyzing may be performed in advance of processing the stream of tuples in the stream computing environment. The analyzing may be performed without an intrusive inspection of a set of source code of the compiled application bundle. Generally, analyzing can include investigating, evaluating, assessing, testing, or otherwise examining the deployment topology model. In embodiments, analyzing the deployment topology model may include evaluating the performance of the compiled application bundle as represented by the deployment topology model. For instance, the deployment topology model may be used to ascertain tuple throughput rates for the stream computing environment in different execution scenarios (e.g., peak traffic times, average usage, during lulls), identify potential points of congestion/bottlenecks (e.g., stream operators that cannot keep up with traffic flow), assess the suitability of stream operator fusion, co-location, and isolation parameters (e.g., based on errors that occurred with respect to co-located operators), determine efficient resource allocations (e.g., how much resources to provide each operator), and appraise tested workload balancing strategies (e.g., focusing workloads on specialized hosts versus spreading jobs over multiple hosts), or the like. In embodiments, analyzing may include comparing the deployment topology model with a benchmark topology model that indicates threshold performance levels to compute a quantitative assessment of the performance of the deployment topology model (e.g., with respect to tuple throughput, security, resource efficient, or other factors). As described herein, the deployment topology model may be analyzed without inspection of the source code, and prior to processing of the stream of tuples in the stream computing environment. Other methods of analyzing the deployment topology model are also possible.

At block 973, the stream environment application overlay configuration may be modified. The modifying may be performed in advance of processing the stream of tuples in the stream computing environment. The modifying may be performed both based on and in response to analyzing the deployment topology model. Generally, modifying can include altering, adjusting, adapting, tweaking, amending, editing, otherwise changing the stream environment application overlay configuration based on and in response to analyzing the deployment topology model. In embodiments, modifying the stream environment application overlay configuration may include revising one or more aspects of the stream environment application overlay configuration to facilitate performance of the compiled application bundle in the stream computing environment. For instance, modifying may include changing a stream operator fusion policy (e.g., to prevent one type of operator from fusing with another), adjusting system resource allocations (e.g., providing more memory to processing elements on a first host), converting hostpool tags (e.g., from "red" and "blue" to "rack1" and "rack2"), reconfiguring a security protocol (e.g., to provide stricter security for a particular host), revising operator parameters or the like. As described herein, modification of the stream environment application overlay configuration may be performed based on and in response to analyzing the deployment topology model. Consider the following example. In response to analyzing the deployment topology model, it may be ascertained that a particular region of the deployment topology model is associated with tuple congestion above a congestion threshold (e.g., tuples are building up in buffer queues of stream operators). Accordingly, modifying the stream environment application overlay configuration may include increasing the memory allocation of stream operators located in the particular region to promote faster tuple processing and mitigate congestion. Other methods of modifying the stream environment application overlay configuration are also possible.

At block 980, the stream of tuples may be processed in the stream computing environment. The processing may be performed using the stream environment application overlay configuration when executing the compiled application bundle.

Method 900 concludes at block 999. Aspects of method 900 may provide performance or efficiency benefits related to configuration management. Altogether, leveraging a stream environment application overlay configuration with respect to a compiled application bundle may be associated with benefits such as stream computing application flexibility, resource usage efficiency, and tuple processing performance. Aspects may save resources such as bandwidth, disk, processing, or memory.

Figure 10:
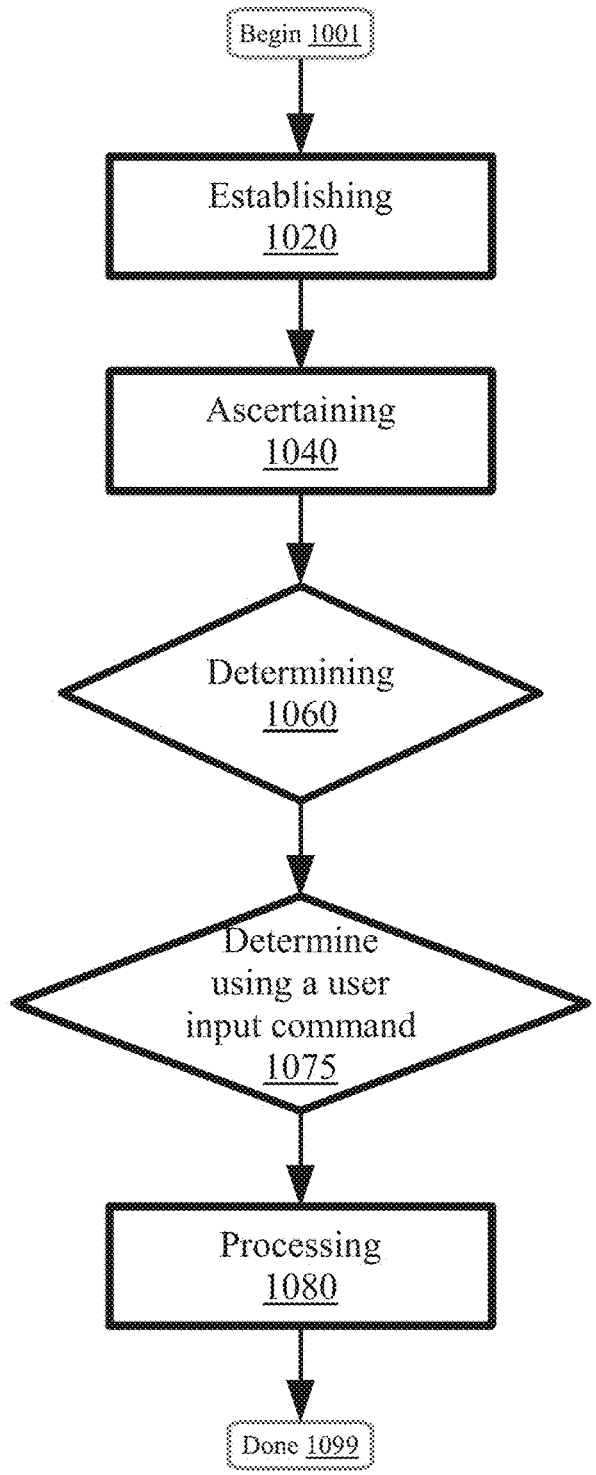
FIG. 10 is a flowchart illustrating a method of configuration management in a stream computing environment to process a stream of tuples using a compiled application bundle, according to embodiments.

FIG. 10 is a flowchart illustrating a method 1000 of configuration management in a stream computing environment to process a stream of tuples using a compiled application bundle, according to embodiments. Aspects of the method 1000 relate to determining the stream environment application overlay configuration using a user input command related to the set of configuration overlay parameter values. Aspects of method 1000 may be similar or the same as method 600/700/800/900, and aspects may be utilized interchangeably. The method 1000 may begin at block 1001.

At block 1020, a set of configuration overlay data may be established. The set of configuration overlay data may include a set of configuration overlay parameters. The establishing may be performed separate from the compiled application bundle. The establishing may be performed for utilization with respect to execution of the compiled application bundle. At block 1040, a set of configuration overlay parameter values for the set of configuration overlay parameters may be ascertained. The ascertaining may be performed with respect to the set of configuration overlay data. At block 1060, a stream environment application overlay configuration may be determined. The determining may be performed based on the set of configuration overlay parameter values for the set of configuration overlay parameters.

At block 1075, the stream environment application overlay configuration may be determined using a user input command related to the set of configuration overlay parameter values. Generally, determining can include formulating, resolving, computing, selecting, calculating, identifying, or otherwise ascertaining the stream environment application overlay configuration using the user input command. The user input command may include an instruction, request, or other directive that specifies an action with respect to the set of configuration overlay parameter values for one or more configuration overlay parameters. In embodiments, the user input command may be configured to target a group of configuration overlay parameter values based on a shared characteristic, and implement an action with respect to the entire group of configuration overlay parameter values to define the stream environment application overlay configuration. For instance, the topology of the compiled application bundle may be analyzed, and a target set of operators may be designated to receive a configuration change. As an example, a user input command may specify a subset of a set of host tags that have a host tag label of "Red," and implement a global change to convert the host tag label of all host tags in the subset from "Red" to "Black." As another example, determining may include receiving a user input command that designates a set of stream operators based on a shared characteristic of "no input" (e.g., all source operators), and indicates an isolation operation to separate the designated set of stream operators on different hosts (e.g., to facilitate debugging operations). Other methods of determining the stream environment application overlay configuration using the user input command are also possible.

At block 1080, the stream of tuples may be processed in the stream computing environment. The processing may be performed using the stream environment application overlay configuration when executing the compiled application bundle.

Method 1000 concludes at block 1099. Aspects of method 1000 may provide performance or efficiency benefits related to configuration management. Altogether, leveraging a stream environment application overlay configuration with respect to a compiled application bundle may be associated with benefits such as stream computing application flexibility, resource usage efficiency, and tuple processing performance. Aspects may save resources such as bandwidth, disk, processing, or memory.

Figure 11:
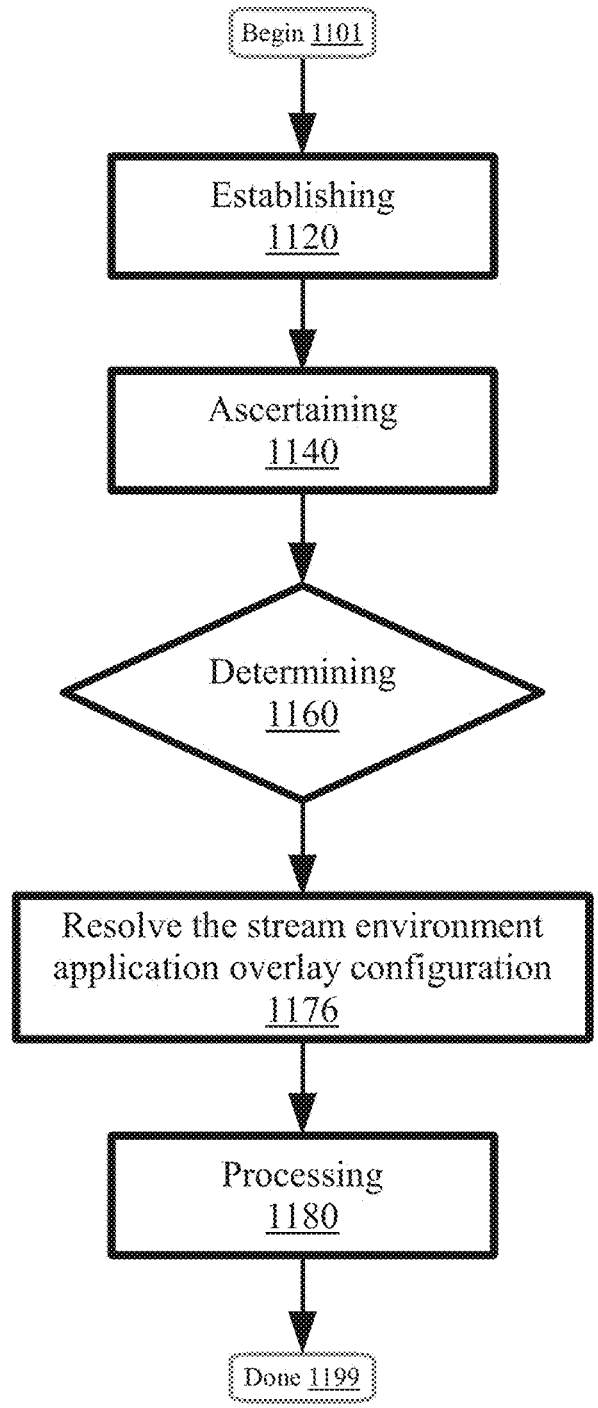
FIG. 11 is a flowchart illustrating a method of configuration management in a stream computing environment to process a stream of tuples using a compiled application bundle, according to embodiments.

FIG. 11 is a flowchart illustrating a method 1100 of configuration management in a stream computing environment to process a stream of tuples using a compiled application bundle, according to embodiments. Aspects of the method 1100 relate to resolving the stream environment application overlay configuration for utilization by one or more different stream computing compiled application bundles. Aspects of method 1100 may be similar or the same as method 600/700/800/900/1000, and aspects may be utilized interchangeably. The method 1100 may begin at block 1101.

At block 1120, a set of configuration overlay data may be established. The set of configuration overlay data may include a set of configuration overlay parameters. The establishing may be performed separate from the compiled application bundle. The establishing may be performed for utilization with respect to execution of the compiled application bundle. At block 1140, a set of configuration overlay parameter values for the set of configuration overlay parameters may be ascertained. The ascertaining may be performed with respect to the set of configuration overlay data. At block 1160, a stream environment application overlay configuration may be determined. The determining may be performed based on the set of configuration overlay parameter values for the set of configuration overlay parameters.

At block 1176, the stream environment application overlay configuration may be resolved for utilization by one or more different stream computing compiled application bundles. Generally, resolving can include formulating, generating, creating, determining, structuring, or otherwise establishing the stream environment application overlay configuration for utilization by one or more different stream computing compiled application bundles. In embodiments, resolving may include structuring the stream environment application overlay configuration according to an establishing formatting standard, such that it may be implemented (e.g., applied to) with respect to a variety of stream computing compiled application bundles. For instance, resolving may include defining the set of configuration overlay parameter values in a general manner (e.g., without application-specific elements) to decouple the stream environment application overlay configuration from a particular compiled application bundle, and enable the same stream environment application overlay configuration to be used in conjunction with other stream computing compiled application bundles. As an example, consider a compiled application bundle having a set of stream operators associated with operator names of "Temperature Sort," "January-March Date Filter," and "Social Media Ingester." Accordingly, resolving can include generating the stream environment application overlay configuration to have generic names for the set of stream operators (e.g., Operator1, Operator2, Operator3), such that the stream environment application overlay configuration may be applied to other stream computing compiled application bundles in other application contexts. Other methods of resolving the stream environment application overlay configuration for utilization by one or more different stream computing compiled application bundles are also possible.

At block 1180, the stream of tuples may be processed in the stream computing environment. The processing may be performed using the stream environment application overlay configuration when executing the compiled application bundle.

Method 1100 concludes at block 1199. Aspects of method 1100 may provide performance or efficiency benefits related to configuration management. Altogether, leveraging a stream environment application overlay configuration with respect to a compiled application bundle may be associated with benefits such as stream computing application flexibility, resource usage efficiency, and tuple processing performance. Aspects may save resources such as bandwidth, disk, processing, or memory.

Figure 12:
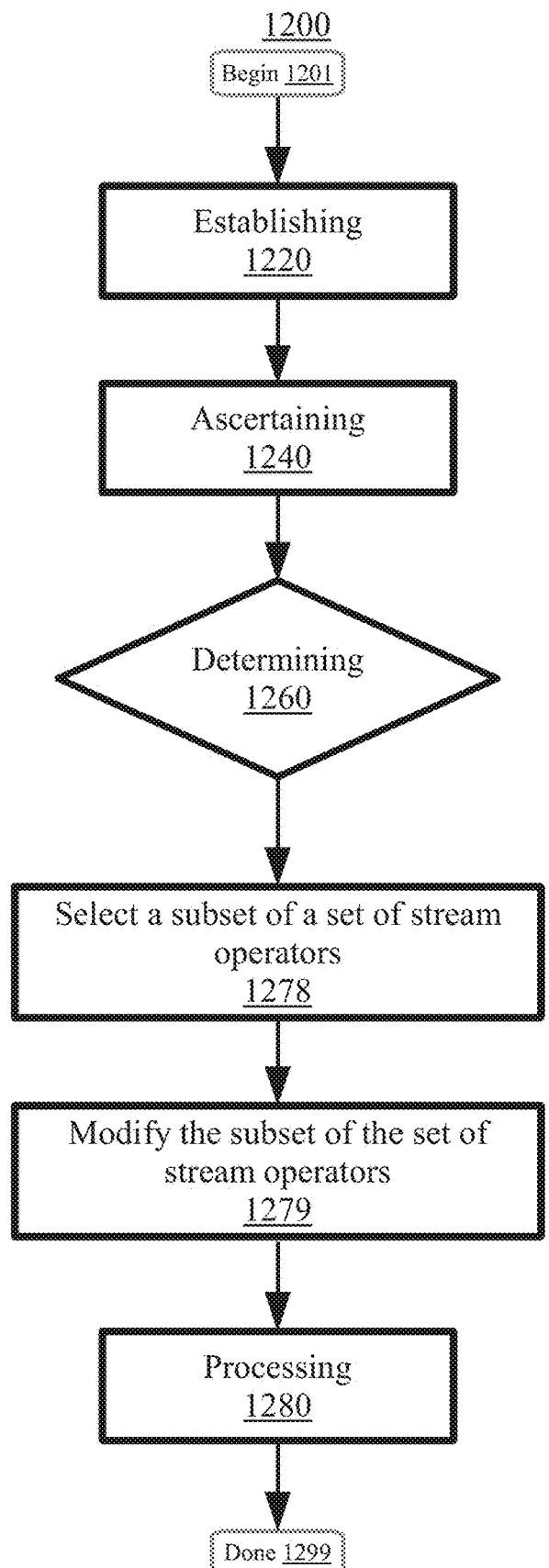
FIG. 12 is a flowchart illustrating a method of configuration management in a stream computing environment to process a stream of tuples using a compiled application bundle, according to embodiments.

FIG. 12 is a flowchart illustrating a method 1200 of configuration management in a stream computing environment to process a stream of tuples using a compiled application bundle, according to embodiments. Aspects of the method 1200 relate to modifying a subset of the set of stream operators that are selected based on a set of identification criteria and a set of stream operator metadata. Aspects of method 1200 may be similar or the same as method 600/700/800/900/1000/1100, and aspects may be utilized interchangeably. The method 1200 may begin at block 1201.

At block 1220, a set of configuration overlay data may be established. The set of configuration overlay data may include a set of configuration overlay parameters. The establishing may be performed separate from the compiled application bundle. The establishing may be performed for utilization with respect to execution of the compiled application bundle. At block 1240, a set of configuration overlay parameter values for the set of configuration overlay parameters may be ascertained. The ascertaining may be performed with respect to the set of configuration overlay data. At block 1260, a stream environment application overlay configuration may be determined. The determining may be performed based on the set of configuration overlay parameter values for the set of configuration overlay parameters.

At block 1278, a subset of a set of stream operators may be selected. The selecting may be performed based on a set of identification criteria and a set of stream operator metadata. Generally, selecting can include choosing, picking-out, electing, detecting, recognizing, distinguishing, or otherwise identifying the subset of the set of stream operators based on the set of identification criteria and the set of stream operator metadata. The set of stream operator metadata may include a collection of information that describes or characterizes a trait, attribute, or feature of the set of stream operators. As examples, the set of stream operator metadata may include the name (e.g., Granular Filter), author data (e.g., when the stream operator was created, the name of the developer who created it), the memory footprint of the stream operator (e.g., 2 megabytes) or the like. The set of identification criteria may include properties, features, attributes, or other characteristics of the set of stream operators that may be used to distinguish a particular stream operator from other stream operators, or mark a stream operator as a part of a group. As examples, the set of identification criteria may include stream operator type (e.g., join, sort, functor), name prefix or suffix (e.g., -filter), naming conventions (e.g., assigned by developers or compilers), region in the operator graph, or the like. In embodiments, selecting the subset of stream operators may include specifying one or more identification criteria and parsing the set of stream operator metadata for the set of stream operators to identify those stream operators that achieve the specified identification criteria. As an example, selecting may include specifying a naming prefix of "Geospatial" and subsequently identifying a subset of stream operators having a naming prefix of "Geospatial" (e.g., as indicated by the set of stream operator metadata). Other methods of selecting the subset of the set of stream operators based on a set of identification criteria and a set of stream operator metadata are also possible.

At block 1279, the subset of the set of stream operators may be modified. The modifying may be performed to process the stream of tuples in the stream computing environment using the stream environment application overlay configuration when executing the compiled application bundle. The modifying may be performed based on the stream environment application overlay configuration. Generally, modifying can include altering, adjusting, adapting, tweaking, amending, editing, otherwise changing the subset of the set of stream operators. In embodiments, modifying the subset of the set of stream operators may include applying a global change with respect to each stream operator of the subset to facilitate processing of the stream of tuples in the stream computing environment. For instance, modifying may include changing a stream operator fusion policy (e.g., to fuse one or more selected stream operators), adjusting system resource allocations for the selected operators (e.g., providing more memory to the selected operators), change the name of the selected operators (e.g., all prefixes of "Initial" should be changed to "Final"), or the like. As an example, consider that a subset of stream operators are selected based on a naming prefix of "ThermalAnalyzer" (e.g., the stream operators are part of a thermal analysis application). Accordingly, modifying may include performing an action with respect to the selected operators. For instance, modifying may include specifying that the subset of stream operators (e.g., having the naming prefix of ThermalAnalyzer) are fused together into a single processing element. As such, the selected subset of stream operators may be fused together into a single processing element to facilitate processing of the stream of tuples in the stream computing environment. Other methods of modifying the subset of the set of stream operators are also possible.

At block 1280, the stream of tuples may be processed in the stream computing environment. The processing may be performed using the stream environment application overlay configuration when executing the compiled application bundle.

Method 1200 concludes at block 1299. Aspects of method 1200 may provide performance or efficiency benefits related to configuration management. Altogether, leveraging a stream environment application overlay configuration with respect to a compiled application bundle may be associated with benefits such as stream computing application flexibility, resource usage efficiency, and tuple processing performance. Aspects may save resources such as bandwidth, disk, processing, or memory.

Figure 13:
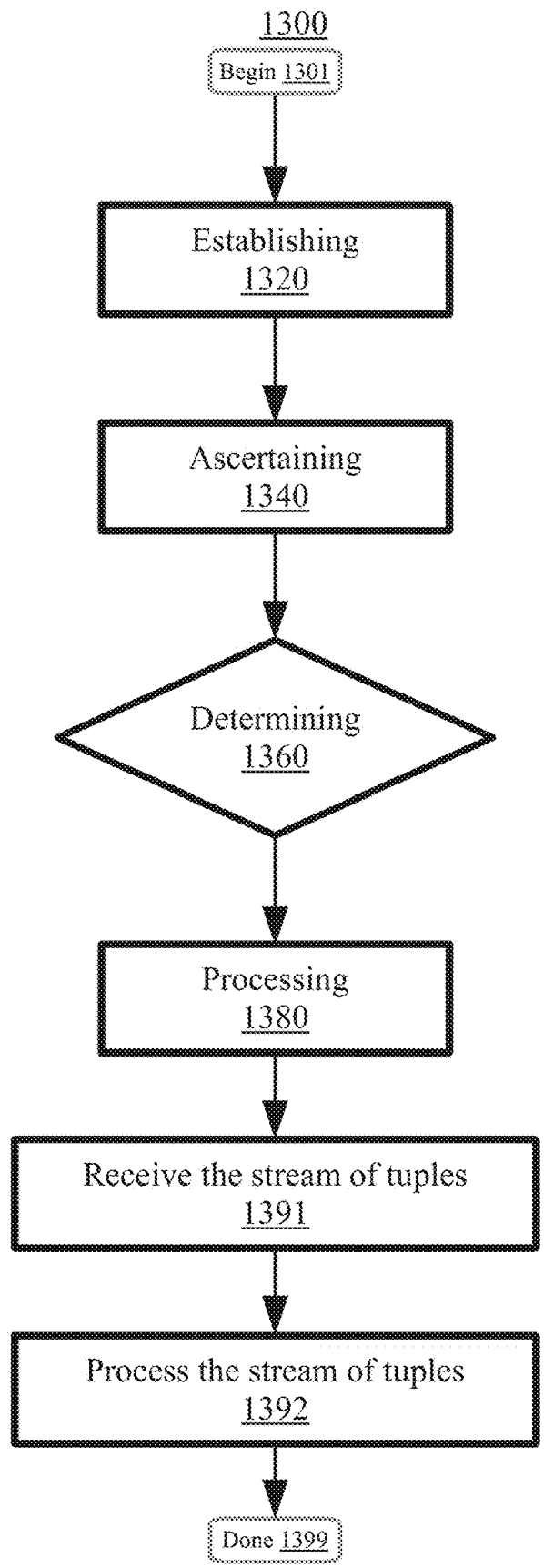
FIG. 13 is a flowchart illustrating a method of configuration management in a stream computing environment to process a stream of tuples using a compiled application bundle, according to embodiments.

FIG. 13 is a flowchart illustrating a method 1300 of configuration management in a stream computing environment to process a stream of tuples using a compiled application bundle, according to embodiments. Aspects of the method 1300 relate to receiving and processing a stream of tuples. Aspects of method 1300 may be similar or the same as method 600/700/800/900/1000/1100/1200, and aspects may be utilized interchangeably. The method 1300 may begin at block 1301.

At block 1320, a set of configuration overlay data may be established. The set of configuration overlay data may include a set of configuration overlay parameters. The establishing may be performed separate from the compiled application bundle. The establishing may be performed for utilization with respect to execution of the compiled application bundle. At block 1340, a set of configuration overlay parameter values for the set of configuration overlay parameters may be ascertained. The ascertaining may be performed with respect to the set of configuration overlay data. At block 1360, a stream environment application overlay configuration may be determined. The determining may be performed based on the set of configuration overlay parameter values for the set of configuration overlay parameters. At block 1380, the stream of tuples may be processed in the stream computing environment. The processing may be performed using the stream environment application overlay configuration when executing the compiled application bundle.

At block 1391, the stream of tuples may be received to be processed by a set of processing elements (e.g., stream operators) which operates on a set of compute nodes (e.g., in a stream application environment). The stream of tuples may be received consistent with the description herein including FIGS. 1-16. Current/future processing by the plurality of processing elements may be performed consistent with the description herein including FIGS. 1-16. The set of compute nodes may include a shared pool of configurable computing resources. For example, the set of compute nodes can be a public cloud environment, a private cloud environment, a distributed batch data processing environment, or a hybrid cloud environment. In certain embodiments, each of the set of compute nodes are physically separate from one another.

At block 1392, the stream of tuples may be processed using the set of processing elements operating on the set of compute nodes. The stream of tuples may be processed by the plurality of processing elements operating on the set of compute nodes. The stream of tuples may be processed consistent with the description herein including FIGS. 1-16. In embodiments, stream operators operating on the set of compute nodes may be utilized to process the stream of tuples. Processing of the stream of tuples by the plurality of processing elements may provide various flexibilities for stream operator management. Overall flow (e.g., data flow) may be positively impacted by utilizing the stream operators.

Method 1300 concludes at block 1399. Aspects of method 1300 may provide performance or efficiency benefits related to configuration management. Altogether, leveraging a stream environment application overlay configuration with respect to a compiled application bundle may be associated with benefits such as stream computing application flexibility, resource usage efficiency, and tuple processing performance. Aspects may save resources such as bandwidth, disk, processing, or memory.

Figure 14:
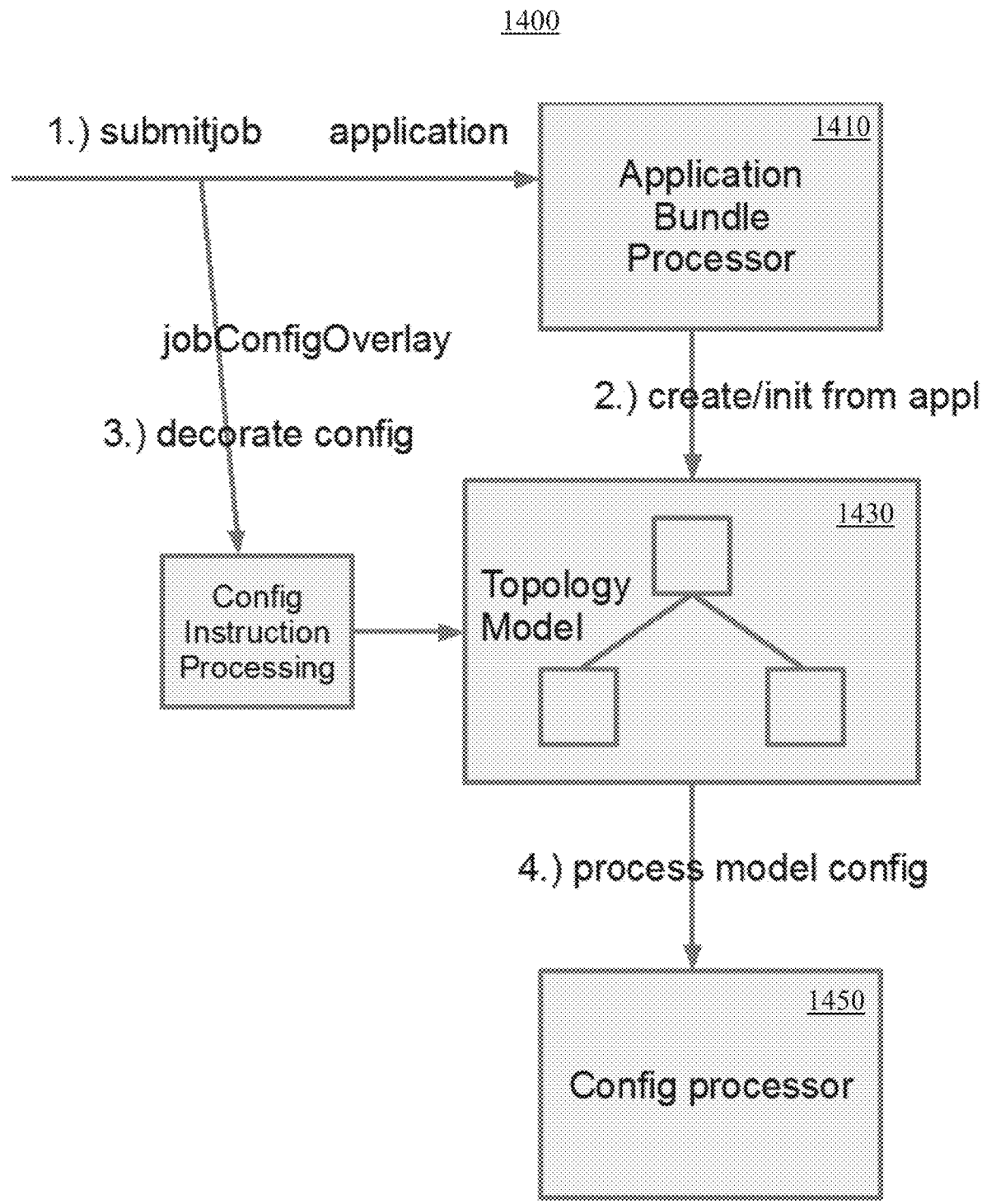
FIG. 14 illustrates an example method of configuration management in a stream computing environment to process a stream of tuples using a compiled application bundle, according to embodiments.

FIG. 14 illustrates an example method 1400 of configuration management in a stream computing environment to process a stream of tuples using a compiled application bundle, according to embodiments. In embodiments, an application (e.g., compiled application bundle) may be submitted to application bundle processor 1410. The application bundle processor 1410 may be configured to evaluate a topology model 1430 of the stream computing environment to generate a stream environment application overlay configuration that is specifically tailored for the application. In embodiments, the stream environment application overlay configuration may be used to decorate an internal topology model (e.g., in an integrated development environment). The stream environment application overlay configuration may be processed using configuration processor 1450 to apply the stream environment application overlay configuration to the application in the stream computing environment. The stream environment application overlay configuration may be used to modify (e.g., customize) execution of the application in the stream computing environment with respect to a particular usage context without requiring recompilation. As described herein, a stream of tuples may be processed by the application using the stream environment application overlay configuration. Other methods of configuration management in a stream computing environment are also possible.

FIG. 15 illustrates an example of a set of configuration data 1500 for configuration management in a stream computing environment to process a stream of tuples using a compiled application bundle, according to embodiments. In embodiments, the set of configuration data 1500 may include a set of role perspective data 1530. As described herein, the set of role perspective data 1530 may include a set of development-oriented data, a set of instance-oriented data, or a set of performance-oriented data. In embodiments, the set of role perspective data 1530 may be used in conjunction with a set of configuration overlay parameters 1550 to ascertain a set of configuration overlay parameter values 1570. The set of configuration overlay parameter values 1570 may be used to determine a stream environment application overlay configuration for a compiled application bundle. Consider the following example. A first set of performance-oriented data 1531 (e.g., collected from a performance tutor) and a first set of development-oriented information 1532 (e.g., collected from an application developer) may be analyzed with respect to a configuration overlay parameter of partition co-location 1553 to determine a configuration overlay parameter value 1575 that indicates partition co-location of a first stream operator with a second stream operator and a third stream operator as well as partition co-location of a fourth stream operator with a fifth stream operator. Accordingly, the configuration overlay parameter value 1575 may be used to determine a stream environment application overlay configuration that may implement the recommended partition co-location operations with respect to the compiled application bundle in the stream computing environment. Other methods of configuration management in a stream computing environment are also possible.

FIG. 16 illustrates an example of a data format 1600 for configuration management in a stream computing environment to process a stream of tuples using a compiled application bundle, according to embodiments. In embodiments, aspects of the disclosure relate to using a JavaScript Object Notation (JSON) format to facilitate implementation of the stream environment application overlay configuration. Accordingly, as shown in FIG. 16, the stream environment application overlay configuration may be structured according to the JSON format. In this way, the stream environment application overlay configuration may be implemented with respect to a variety of different stream computing application bundles to facilitate processing of streams of tuples. Other methods of configuration management in a stream computing environment are also possible.

In addition to embodiments described above, other embodiments having fewer operational steps, more operational steps, or different operational steps are contemplated. Also, some embodiments may perform some or all of the above operational steps in a different order. In embodiments, operational steps may be performed in response to other operational steps. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

What is claimed is:

1. A system of configuration management in a stream computing environment to process a stream of tuples using a compiled application bundle, the system comprising:
 a memory having a set of computer readable computer instructions, and
 a processor for executing the set of computer readable instructions, the set of computer readable instructions including:
 establishing, separate from the compiled application bundle for utilization with respect to execution of the compiled application bundle, a set of configuration overlay data which includes a set of configuration overlay parameters, wherein the set of configuration overlay parameters includes a plurality of partition co-location instructions;
 ascertaining, with respect to the set of configuration overlay data, a set of configuration overlay parameter values for the set of configuration overlay parameters;
 determining, based on the set of configuration overlay parameter values for the set of configuration overlay parameters, a stream environment application overlay configuration, wherein determining the stream environment application overlay configuration further comprises:
  aggregating the set of configuration overlay parameter values, wherein the configuration overlay parameter values are selected from a group consisting of development-oriented contexts, instance-oriented contexts, and performance-oriented contexts; and
  assembling the stream environment application overlay configuration for the compiled application bundle using the aggregation of the set of configuration overlay parameter values;
 constructing, based on the stream environment application overlay configuration, a deployment topology model in advance of processing the stream of tuples in the stream computing environment;
 modifying, both based on and in response to analyzing the deployment topology model, the stream environment application overlay configuration in advance of processing the stream of tuples in the stream computing environment; and
 processing, using the stream environment application overlay configuration when executing the compiled application bundle, the stream of tuples in the stream computing environment.

2. The system of claim 1, further comprising:
 customizing, using the stream environment application overlay configuration based on the set of configuration overlay parameter values for the set of configuration overlay parameters, an execution of the compiled application bundle without a recompilation of the compiled application bundle.

3. The system of claim 2, further comprising:
 performing the configuration management on an individual job-by-job basis to utilize job-specific stream environment application overlay configurations for streams processing using the compiled application bundle without the recompilation of the compiled application bundle.

4. The system of claim 1, further comprising:
 ascertaining, with respect to the set of configuration overlay data, a set of development-oriented data for the set of configuration overlay parameter values for the set of configuration overlay parameters; and
 determining, based on the set of development-oriented data for the set of configuration overlay parameter values for the set of configuration overlay parameters, the stream environment application overlay configuration.

5. The system of claim 1, further comprising:
 ascertaining, with respect to the set of configuration overlay data, a set of instance-oriented data for the set of configuration overlay parameter values for the set of configuration overlay parameters; and
 determining, based on the set of instance-oriented data for the set of configuration overlay parameter values for the set of configuration overlay parameters, the stream environment application overlay configuration.

6. The system of claim 1, further comprising:
 ascertaining, with respect to the set of configuration overlay data, a set of performance-oriented data for the set of configuration overlay parameter values for the set of configuration overlay parameters; and
 determining, based on the set of performance-oriented data for the set of configuration overlay parameter values for the set of configuration overlay parameters, the stream environment application overlay configuration.

7. The system of claim 1, further comprising:
 establishing, separate from the compiled application bundle for utilization with respect to execution of the compiled application bundle, the set of configuration overlay data which includes the set of configuration overlay parameters for a set of stream operator parameters;
 ascertaining, with respect to the set of configuration overlay data, a set of stream operator data for the set of configuration overlay parameter values for the set of configuration overlay parameters; and
 determining, based on the set of stream operator data for the set of configuration overlay parameter values for the set of configuration overlay parameters, the stream environment application overlay configuration.

8. The system of claim 1, further comprising:
 establishing, separate from the compiled application bundle for utilization with respect to execution of the compiled application bundle, the set of configuration overlay data which includes the set of configuration overlay parameters for a set of processing element placement parameters;
 ascertaining, with respect to the set of configuration overlay data, a set of processing element placement data for the set of configuration overlay parameter values for the set of configuration overlay parameters; and
 determining, based on the set of processing element placement data for the set of configuration overlay parameter values for the set of configuration overlay parameters, the stream environment application overlay configuration.

9. The system of claim 1, further comprising:
 establishing, separate from the compiled application bundle for utilization with respect to execution of the compiled application bundle, the set of configuration overlay data which includes the set of configuration overlay parameters for a set of host-oriented parameters;
 ascertaining, with respect to the set of configuration overlay data, a set of host-oriented data for the set of configuration overlay parameter values for the set of configuration overlay parameters; and determining, based on the set of host-oriented data for the set of configuration overlay parameter values for the set of configuration overlay parameters, the stream environment application overlay configuration.

10. The system of claim 1, further comprising:
establishing, separate from the compiled application bundle for utilization with respect to execution of the compiled application bundle, the set of configuration overlay data which includes the set of configuration overlay parameters for a set of job-oriented parameters;
ascertaining, with respect to the set of configuration overlay data, a set of job-oriented data for the set of configuration overlay parameter values for the set of configuration overlay parameters; and
determining, based on the set of job-oriented data for the set of configuration overlay parameter values for the set of configuration overlay parameters, the stream environment application overlay configuration.

11. The system of claim 1, further comprising
meshing, to determine the stream environment application overlay configuration, a first configuration overlay parameter value of the set of configuration overlay parameter values for a first configuration overlay parameter of the set of configuration overlay parameters with a second configuration overlay parameter value of the set of configuration overlay parameter values for the first configuration overlay parameter of the set of configuration overlay parameters.

12. The system of claim 1, further comprising:
analyzing, without an intrusive inspection of a set of source code of the compiled application bundle, the deployment topology model in advance of processing the stream of tuples in the stream computing environment.

13. The system of claim 1, further comprising:
determining, using a user input command related to the set of configuration overlay parameter values, the stream environment application overlay configuration.

14. The system of claim 1, further comprising:
resolving the stream environment application overlay configuration for utilization by one or more different stream computing compiled application bundles.

15. The system of claim 1, further comprising:
selecting, based on a set of identification criteria and a set of stream operator metadata, a subset of a set of stream operators; and
modifying, based on the stream environment application overlay configuration, the subset of the set of stream operators to process the stream of tuples in the stream computing environment using the stream environment application overlay configuration when executing the compiled application bundle.

16. The system of claim 1, further comprising:
executing, in a dynamic fashion to streamline configuration management in the stream computing environment, each of:
the establishing, the ascertaining, the determining, and the processing.

17. The system of claim 1, further comprising:
executing, in an automated fashion without user intervention, each of:
the establishing, the ascertaining, the determining, and the processing.

18. The system of claim 1, further comprising:
receiving the stream of tuples to be processed by a set of processing elements which operates on a set of compute nodes; and
processing, using the set of processing elements operating on the set of compute nodes, the stream of tuples.

19. A computer program product of configuration management in a stream computing environment to process a stream of tuples using a compiled application bundle, the computer program product comprising a computer readable storage medium having program instructions embodied therewith, wherein the computer readable storage medium is not a transitory signal per se, the program instructions executable by a processor to cause the processor to perform a method comprising:
establishing, separate from the compiled application bundle for utilization with respect to execution of the compiled application bundle, a set of configuration overlay data which includes a set of configuration overlay parameters, wherein the set of configuration overlay parameters includes a plurality of partition co-location instructions;
ascertaining, with respect to the set of configuration overlay data, a set of configuration overlay parameter values for the set of configuration overlay parameters;
determining, based on the set of configuration overlay parameter values for the set of configuration overlay parameters, a stream environment application overlay configuration, wherein determining the stream environment application overlay configuration further comprises:
aggregating the set of configuration overlay parameter values, wherein the configuration overlay parameter values are selected from a group consisting of development-oriented contexts, instance-oriented contexts, and performance-oriented contexts; and
assembling the stream environment application overlay configuration for the compiled application bundle using the aggregation of the set of configuration overlay parameter values;
constructing, based on the stream environment application overlay configuration, a deployment topology model in advance of processing the stream of tuples in the stream computing environment;
modifying, both based on and in response to analyzing the deployment topology model, the stream environment application overlay configuration in advance of processing the stream of tuples in the stream computing environment; and
processing, using the stream environment application overlay configuration when executing the compiled application bundle, the stream of tuples in the stream computing environment.

* * * * *